United States Patent
Gindele et al.

(10) Patent No.: US 7,181,086 B2
(45) Date of Patent: Feb. 20, 2007

(54) MULTIRESOLUTION METHOD OF SPATIALLY FILTERING A DIGITAL IMAGE

(75) Inventors: Edward B. Gindele, Rochester, NY (US); Andrew C. Gallagher, Brockport, NY (US)

(73) Assignee: Eastman Kodak Company, Rochester, NY (US)

(*) Notice: Subject to any disclaimer, the term of this patent is extended or adjusted under 35 U.S.C. 154(b) by 623 days.

(21) Appl. No.: 10/163,401

(22) Filed: Jun. 6, 2002

(65) Prior Publication Data

US 2003/0228064 A1 Dec. 11, 2003

(51) Int. Cl.
G06K 9/40 (2006.01)

(52) U.S. Cl. .......... 382/265; 382/274

(58) Field of Classification Search .......... 382/274, 382/265

See application file for complete search history.

(56) References Cited

U.S. PATENT DOCUMENTS

| | | | | |
|---|---|---|---|---|
| 4,674,125 A | * | 6/1987 | Carlson et al. | 382/303 |
| 4,731,671 A | | 3/1988 | Alkofer | 382/274 |
| 5,012,333 A | * | 4/1991 | Lee et al. | 358/520 |
| 5,454,044 A | | 9/1995 | Nakajima | 382/132 |
| 5,461,655 A | * | 10/1995 | Vuylsteke et al. | 378/62 |
| 5,467,404 A | | 11/1995 | Vuylsteke et al. | 382/274 |
| 5,471,987 A | | 12/1995 | Nakazawa et al. | 600/436 |
| 5,488,674 A | * | 1/1996 | Burt et al. | 382/284 |
| 5,526,446 A | * | 6/1996 | Adelson et al. | 382/275 |
| 5,576,548 A | * | 11/1996 | Clarke et al. | 250/369 |
| 5,694,447 A | * | 12/1997 | Ito | 378/62 |
| 5,717,791 A | * | 2/1998 | Labaere et al. | 382/274 |
| 5,740,268 A | * | 4/1998 | Nishikawa et al. | 382/132 |
| 5,796,870 A | | 8/1998 | Takeo | 382/232 |
| 5,805,721 A | * | 9/1998 | Vuylsteke et al. | 382/128 |
| 5,822,453 A | | 10/1998 | Lee et al. | 382/169 |
| 5,825,909 A | * | 10/1998 | Jang | 382/132 |
| 5,898,798 A | * | 4/1999 | Bouchard et al. | 382/242 |

(Continued)

OTHER PUBLICATIONS

Chung-Hui Kuo, Tewfik, A.H., Multiscale sigma filter and active contour for image segmentation, 1999, Image Processing, 1999. ICIP 99. Proceedings. 1999 International Conference on, ISBN: 0-7803-5467-2.*

(Continued)

Primary Examiner—Bhavesh M. Mehta
Assistant Examiner—Sath V. Perungavoor
(74) Attorney, Agent, or Firm—Raymond L. Owens

(57) ABSTRACT

A method of processing a digital image to improve tone scale, includes the steps of: generating a multiresolution image representation of the digital image including a plurality of base digital images and a plurality of residual digital images; applying a texture reducing spatial filter to the base digital images to produce texture reduced base digital images; combining the texture reduced base digital images and the residual digital images s to generate a texture reduced digital image; subtracting the texture reduced digital image from the digital image to produce a texture digital image; applying a compressive tone scale function to the texture reduced digital image to produce a tone scale adjusted digital image having a compressed tone scale in at least a portion of the image; and combining the texture digital image with the tone scale adjusted digital image to produce a processed digital image, whereby the contrast of the digital image is improved without compressing the contrast of the texture in the digital image.

54 Claims, 24 Drawing Sheets

U.S. PATENT DOCUMENTS

| | | | |
|---|---|---|---|
| 5,905,817 A | | 5/1999 | Matama .................. 382/260 |
| 5,907,642 A | * | 5/1999 | Ito ........................ 382/302 |
| 5,946,419 A | * | 8/1999 | Chen et al. ............. 382/243 |
| 5,963,676 A | * | 10/1999 | Wu et al. ............... 382/274 |
| 5,982,917 A | * | 11/1999 | Clarke et al. .......... 382/132 |
| 5,991,457 A | | 11/1999 | Ito et al. ................ 382/254 |
| 6,097,470 A | * | 8/2000 | Buhr et al. ............. 355/38 |
| 6,151,420 A | * | 11/2000 | Wober et al. .......... 382/275 |
| 6,282,683 B1 | * | 8/2001 | Dapper et al. ......... 714/746 |
| 6,285,798 B1 | | 9/2001 | Lee ........................ 382/260 |
| 6,317,521 B1 | | 11/2001 | Gallagher et al. ..... 382/260 |
| 6,373,992 B1 | * | 4/2002 | Nagao .................... 382/266 |
| 6,548,800 B2 | * | 4/2003 | Chen et al. ............. 250/208.1 |

OTHER PUBLICATIONS

GEO 5145c Remote Sensing, http://www.clas.ufl.edu/users/mbinford/geo5134c/2005%20lectures/Lecture_5_2005_preprocessing_enhancement_4slides.pdf.*

Burt et al., The Laplacian Pyramid as a Compact Image Code, *IEEE Transactions of Communications*, vol. COM-31, No. 4, Apr. 1983, pp. 532-540.

Lee, Digital Image Smoothing and the Sigma Filter, *Computer Vision, Graphics, and Image Processing*, 24, 1983, pp. 255-269.

Press et al., Numerical Recipes, The Art of Scientific Computing, Cambridge Univeristy Press, pp. 98-101.

U.S. Appl. No. 09/413,398, filed Oct. 6, 1999 by Gindele.

U.S. Appl. No. 09/742,957, filed Dec. 20, 2000 by Gindele.

U.S. Appl. No. 09/457,036, filed Dec. 8, 1999 by Gallagher.

* cited by examiner

MULTIRESOLUTION METHOD OF SPATIALLY FILTERING A DIGITAL IMAGE

FIELD OF INVENTION

The present invention relates to an improved method of spatially filtering digital images.

BACKGROUND OF THE INVENTION

It is well known that the dynamic range of an image captured with an image capture device (such as a photographic negative) is often greater than the dynamic range of the output medium (such as a photographic paper or CRT monitor). The result of this incongruity is that a good deal of scene content is rendered to black or white on the output image. For this reason, in an image processing environment, a tone scale function may be used to reduce the scene dynamic range in order to map more information onto the output medium, in a process called dynamic range modification or dynamic range compression. There exist many processes for creating a tone scale function on an image dependent basis (e.g. see U.S. Pat. No. 5,471,987 issued Dec. 5, 1995 to Nakazawa et al.). Each of the conventional tone scale function processes examines certain statistical characteristics of the image under consideration in order to automatically generate the tone scale function. In addition, tone scale function may be generated with manual interactive tools by a human operator.

After the tone scale function has been generated, there exists the question of how to apply the tone scale function to the digital image. The goal of dynamic range compression is to adjust the overall dynamic range of the image, rather than to affect the contrast of any given object in the image. In essence, tone scale function should be applied to an image in such a way as to minimize the effect to the scene texture. To that end, it is common to apply the tone scale function to a low frequency sub-band of the image, preserving the higher frequency sub-band(s) that are considered image texture (e.g. see U.S. Pat. No. 5,012,333 issued Apr. 30, 1991 to Lee et al.).

In U.S. Pat. No. 5,012,333, Lee describes a procedure for preserving the high frequency detail of an image by blurring the image neutral channel in order to create a low-pass signal. Subtracting the low-pass signal from the image neutral channel produces a high-pass signal. The processed image is generated by applying the tone scale function to the low-pass signal and adding the result to the high-pass signal. This procedure preserves a segment of the image frequency spectrum; however, artifacts are seen at object boundaries in the image. Gallagher and Gindele build on this work; see U.S. Pat. No. 6,317,521 issued Nov. 13, 2001. More specifically, Gallagher incorporates an artifact avoidance scheme along with a single standard FIR filter to generate the texture signal. While this improvement reduces the occurrence of artifacts in the final image, the artifacts can still be visible.

Also, in U.S. Pat. No. 5,454,044 issued Sep. 26, 1995, Nakajima suggests modifying the image contrast by a formula Sproc=Sorg+f(Sus). In U.S. Pat. No. 5,905,817 issued May 18, 1999, Matama describes using an IIR filter in essentially the same framework as Lee. The advantage of this approach is a reduction in the computational resource requirements.

Each of these methods of applying a tone scale function to an image channel relies on a single blurring with a linear filter. Because of this, there is an inherent size selectivity property in the tone scale function application process. Image structures that are spatially smaller than a certain size are preserved, while details larger than that size are affected by the tone scale function. In addition, the preservation of high frequencies in the image may lead to the creation of unsharp mask type artifacts (overshoot and undershoot) in the neighborhood of large image edges (characteristic of large occlusion boundaries or dark shadows.) In general, it was observed that larger digital filters (used to create the low-pass signal) result in a more pleasing processed image, except for the fact that the artifacts may become more objectionable.

Another approach to the problem of dynamic range modification is to use nonlinear filtering techniques that essentially preserve edges but blur out detail. In U.S. Pat. No. 5,796,870 issued Aug. 18, 1998, Takeo describes a large, rectangular filter, long in the direction along an edge and short in the direction across the edge. This approach reduces the artifacts at edges, but diagonal edges pose a problem. Further, Nakazawa et al. in U.S. Pat. No. 5,471,987, referenced above, describe using an FIR filter whose weights are determined at each pixel location, based on the absolute value of the differences of pixel intensities between two pixels falling under the digital filter. Finally, Gallagher describes (in U.S. Ser. No. 09/457,036 filed Dec. 8, 1999) an adaptive recursive filter having means to adaptively avoid blurring across edge boundaries. These methods are rather time consuming. In addition, it has been found that optimal dynamic range modification cannot be realized by sensing edges at only a single resolution of the image.

Several authors have introduced methods for achieving dynamic range modification of an image by decomposing the image into multiple resolutions. For example, in U.S. Pat. Nos. 5,467,404 issued Nov. 14, 1995, and 5,805,721 issued Sep. 8, 1988, Vuylsteke et al. teach a method of decomposing an image into multiple resolutions and using a pre-determined nonlinear amplitude compression function for the high frequency component in each resolution. A deficiency of this method is that the amplitude at each resolution does not adequately identify whether the signal is part of a large amplitude edge or an image texture. A similar invention was disclosed in U.S. Pat. No. 5,717,791 issued Feb. 10, 1998 to Labaere et al., which describes a similar dynamic range compression scheme using wavelet filters to generate the multiple resolutions.

In U.S. Pat. No. 5,907,642 issued May 25, 1999, Ito describes a method of image enhancement based on processing the detail signals of a multiple resolution image representation. Ito describes suppressing the magnitude of detail signals in situations where the next lower detail signal has small magnitude. In U.S. Pat. No. 5,991,457 issued Nov. 23, 1999, Ito describes a method of generating several band pass detail image signals which are modified by application of non-linear functions to modify the dynamic range of the image.

In U.S. Pat. No. 6,285,798 B1 issued Sep. 4, 2001, Lee describes yet another dynamic range compression method using a multiple resolution representation of an image. Lee describes a method of using wavelet filters to create a plurality of coarse signals and detail signals, modifying the detail signals in accordance with contrast gain signals created by detecting the edges of the coarse scale edges, and adding the modified detail signals to the coarse signals to obtain an output image.

In each of these dynamic range compression techniques using multiple image resolutions, the high frequency (or edge or band pass) components of the multiple resolution representation are modified to affect the image dynamic range. However, it is often inconvenient to operate on the high frequency component of the multiple image resolution. In addition, the characteristics of the high frequency signals vary as a function of the level within the multiple image representation of the image. This variability requires a complicated parameter tuning in order to achieve optimal dynamic range compression without producing objectionable artifacts (such as the aforementioned overshoot and undershoot artifact) using a multiple image resolution representation of the image.

Multiresolution, or pyramid methods as a means of representing images as a function of spatial resolution for image processing, has a long history. Burt and Adelson, described a method of representing a digital image by a series of residual images and a base digital image in their journal article "The Laplacian Pyramid as a Compact Image Code" IEEE Transactions on Communications, Vol. Com-31, No. 4, April 1983. However the method taught by Burt et al. was designed for image compression applications and cannot be used for enhancing the tone scale of a digital image. Thus, there exists a need for an improved dynamic range modification technique that uses a multiple resolution representation.

SUMMARY OF THE INVENTION

The need is met according to the present invention by providing a method of processing a digital image to improve tone scale that includes the steps of: generating a multiresolution image representation of the digital image including a plurality of base digital images and a plurality of residual digital images; applying a texture reducing spatial filter to the base digital images to produce texture reduced base digital images; combining the texture reduced base digital images and the residual digital images to generate a texture reduced digital image; subtracting the texture reduced digital image from the digital image to produce a texture digital image; applying a compressive tone scale function to the texture reduced digital image to produce a tone scale adjusted digital image having a compressed tone scale in at least a portion of the image; and combining the texture digital image with the tone scale adjusted digital image to produce a processed digital image, whereby the contrast of the digital image is improved without compressing the contrast of the texture in the digital image.

BRIEF DESCRIPTION OF THE DRAWINGS

FIG. 8a is a functional block diagram showing in more detail the pyramid level regeneration module of FIG. 7a;

FIG. 9a is a functional block diagram of the pedestal filter module of FIG. 8a;

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

Figure 1:
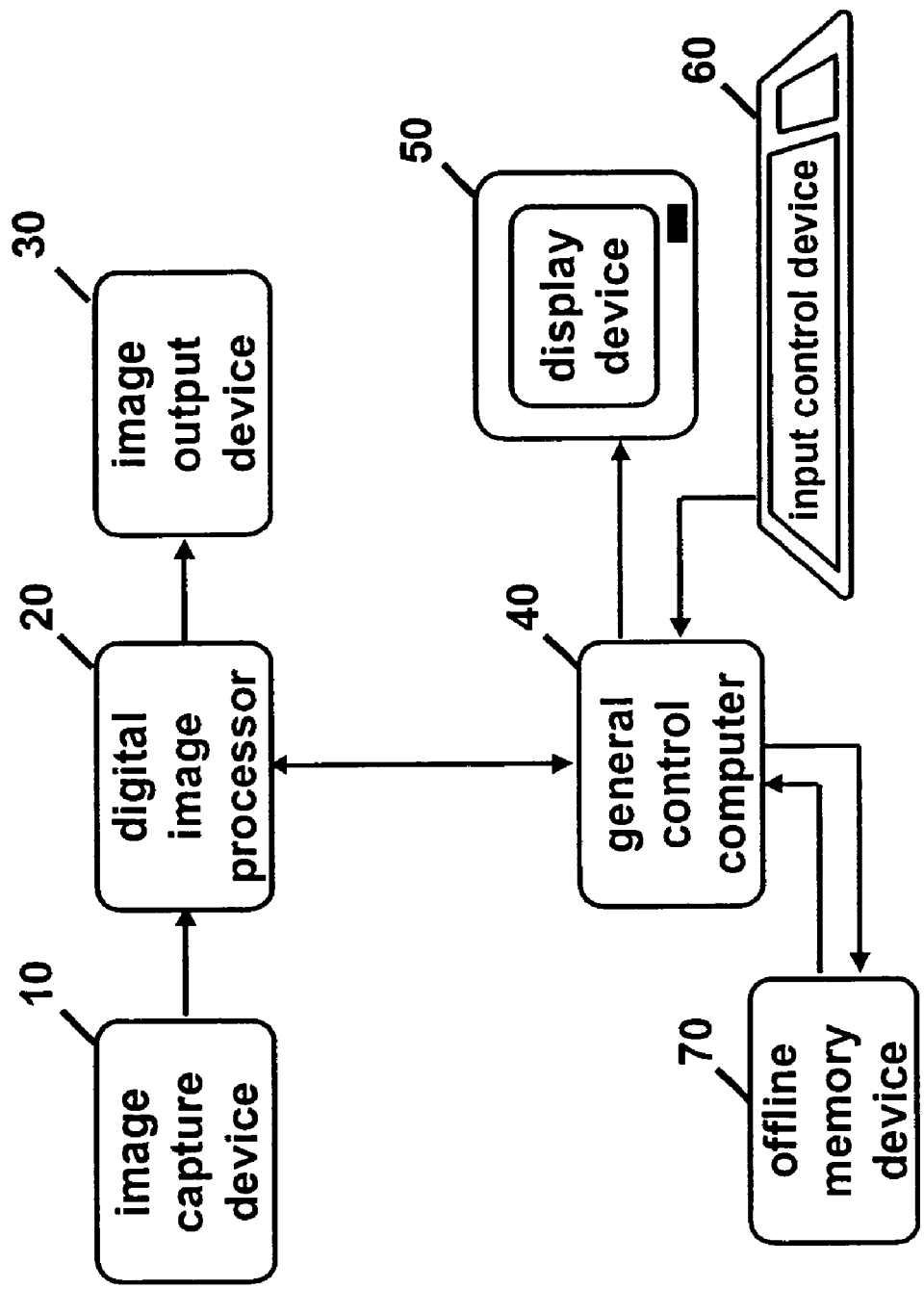
FIG. 1 is a functional block diagram of a computer system suitable for practicing the present invention.

The present invention may be implemented in computer hardware. Referring to FIG. 1, the following description relates to a digital imaging system which includes an image capture device 10, a digital image processor 20, an image output device 30, and a general control computer 40. The system can include a display device 50 such as a computer console or paper printer. The system can also include an input control device 60 for an operator such as a keyboard and or mouse pointer. The present invention can be used on multiple capture devices 10 that produce digital images. For example, FIG. 1 can represent a digital photofinishing system where the image capture device 10 is a conventional photographic film camera for capturing a scene on color negative or reversal film, and a film scanner device for scanning the developed image on the film and producing a digital image. The digital image processor 20 provides the means for processing the digital images to produce pleasing looking images on the intended output device or media. The present invention can be used with a variety of output devices 30 which can include, but is not limited to, a digital photographic printer and soft copy display. The digital image processor 20 can be used to process digital images to make adjustments for overall brightness, tone scale, image structure, etc. of digital images in a manner such that a pleasing looking image is produced by an image output device 30. Those skilled in the art will recognize that the present invention is not limited to just these mentioned image processing functions.

The general control computer 40 shown in FIG. 1 can store the present invention as a computer program stored in a computer readable storage medium, which may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device 70. Before describing the present invention, it facilitates understanding to note that the present invention is preferably utilized on any well-known computer system, such as a personal computer.

It should also be noted that the present invention implemented in a combination of software and/or hardware is not limited to devices which are physically connected and/or located within the same physical location. One or more of the devices illustrated in FIG. 1 may be located remotely and may be connected via a wireless connection.

A digital image is comprised of one or more digital image channels. Each digital image channel is comprised of a two-dimensional array of pixels. Each pixel value relates to the amount of light received by the imaging capture device corresponding to the physical region of pixel. For color imaging applications, a digital image will often consist of red, green, and blue digital image channels. For monochrome applications, the digital image will only contain one digital image channel. Motion imaging applications can be thought of as a sequence of digital images. Those skilled in the art will recognize that the present invention can be applied to, but is not limited to, a digital image channel for any of the above mentioned applications. Although a digital image channel is described as a two dimensional array of pixel values arranged by rows and columns, those skilled in the art will recognize that the present invention can be applied to mosaic (non rectilinear) arrays with equal effect. Those skilled in the art will also recognize that for digital image processing steps described hereinbelow as replacing original pixel values with processed pixel values is functionally equivalent to describing the same processing steps as generating a new digital image with the processed pixel values while retaining the original pixel values.

There are many different types of tone scale functions that can be applied to digital images for enhancement purposes. Some digital images are derived from original scenes photographed that have a high dynamic range of intensities present. In general, it is difficult to make pleasing prints from these high dynamic range digital images since the range of pixel values is so large. For a typical high dynamic range digital image, the image content in the highlight regions (bright portions) and shadow regions (dark portions) will often be rendered without detail since photographic paper can only reproduce faithfully a limited range of intensities. Therefore, a compressive tone scale function, i.e. a tone scale function designed to compress, or reduce, the dynamic range of a digital image, can be applied to a high dynamic range digital image to reduce the numerical range of pixel values. This processed digital image when printed will reproduce more spatial detail in the highlight and shadow regions than if the tone scale function had not been applied. Unfortunately, the application of a compressive tone scale function can also compress, or reduce the magnitude of, the fine spatial detail of the image content. Therefore, the processed images with the direct application of a tone scale function can result in dull uninteresting images.

The preferred embodiment of the present invention uses a multiresolution spatial filter to apply a tone scale function to a digital image. The multiresolution spatial filter is used to separate an original digital image into two parts—a pedestal part and a texture part. The texture part contains image content that relates to edges and fine spatial detail. A tone scale function is applied to the pedestal part. Since the pedestal part does not contain fine spatial detail, the application of the tone scale function to the pedestal part does not reduce the magnitude of the fine spatial detail. The fine spatial detail is preserved in the texture part which is recombined with the processed pedestal part. The resulting process achieves the goal of reducing the overall range of pixel values to fit within the printable range of pixel values for the photographic paper but doesn't reduce the magnitude of fine detail in the processed image.

Figure 2A:
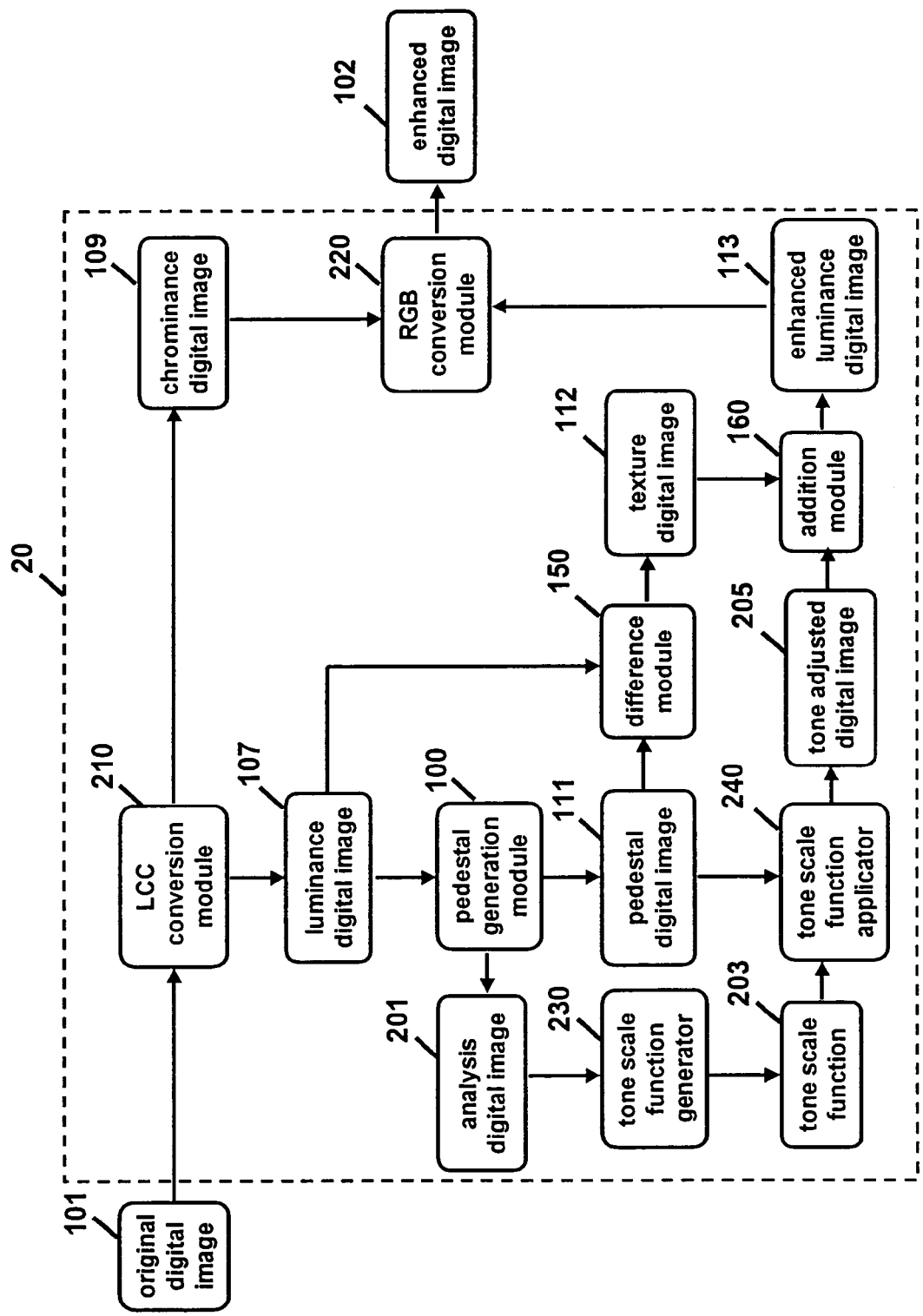
FIG. 2a is a functional block diagram of the digital image processor of FIG. 1.

The digital image processor 20 shown in FIG. 1 is illustrated in more detail in FIG. 2a. An original digital image 101 can be received from the image capture device (shown in FIG. 1) in a variety of different color representations. However, the most typical implementation of the present invention receives the original digital image as a color digital image with red, green, and blue digital image channels. The LCC conversion module 210 receives the original digital image 101 and generates a luminance digital image 107 (containing luminance information with only one digital image channel) and a chrominance digital image 109 (containing the color information as two color-difference digital image channels). The luminance digital image 107 is processed using a multiresolution spatial filter and a tone scale function 203 which results in an enhanced luminance digital image 113. The chrominance digital image 109 and the enhanced luminance digital image 113 are received by the RGB conversion module 220 which performs a color transformation and generates the enhanced digital image 102 (containing red, green, and blue digital image channels) which is in the same color representation as the original digital image 101.

The pedestal generation module 100 receives the luminance digital image 107 and applies a multiresolution spatial filter to the luminance digital image to generate a pedestal digital image 111. As part of the processing, the pedestal generation module 100 selectively filters spatial detail from the luminance digital image 107. The resulting pedestal digital image 111 lacks most of the fine spatial of the luminance digital image 107 but retains most of the edge information content. Also produced by the pedestal generation module 100 is the analysis digital image 201 which is a lower spatial resolution version of the luminance digital image 107, i.e. the analysis digital image 201 contains the same image content but has fewer pixels to represent the image content. It should be noted that the analysis digital image 201 can also be generated in a separate module from the original digital image 101. The analysis digital image 201 is received by the tone scale function generator 230 which analyzes the image content of the analysis digital image and generates a tone scale function 203. The tone scale function 203 is a single valued function, implemented in the form of a look-up-table, that contains a single output pixel value for each possible input pixel value. The tone scale function 203 is then applied to the pedestal digital image 111 by the tone scale function applicator 240 to generate a tone scale adjusted digital image 205. However, since the pedestal digital image 111 is a highly modified version of the luminance digital image 107, the full enhancement processing must also include the missing fine spatial detail. The difference module 150 receives luminance digital image 107 and the pedestal digital image 111 and subtracts the pedestal digital image 111 from the luminance digital image 107 to generate the texture digital image 112. The addition module 160 adds the texture digital image 112 to the tone scale adjusted digital image 205 to form the enhanced luminance digital image 113.

Figure 2B:
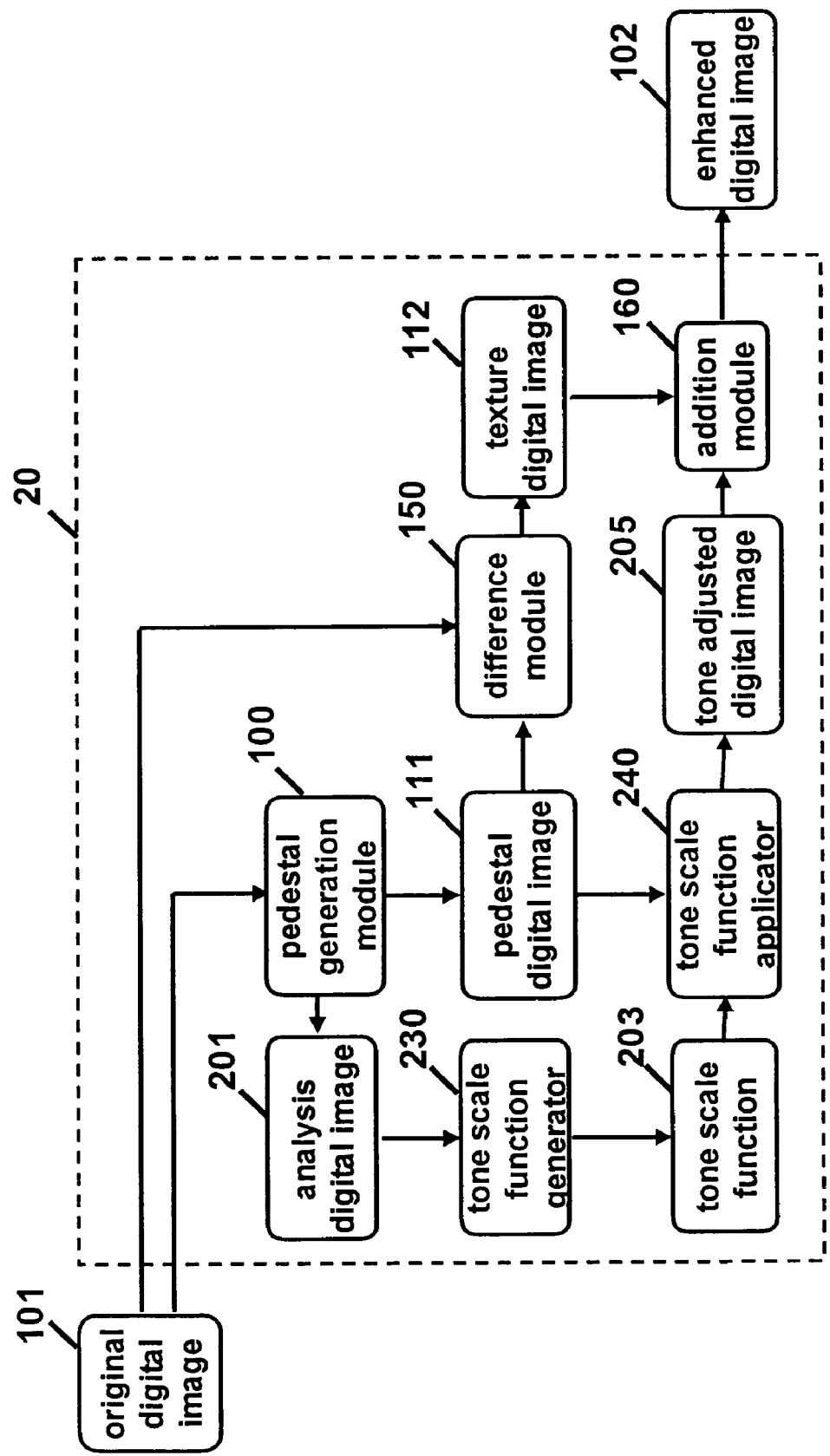
FIG. 2b is a functional block diagram of the digital image processor of FIG. 1 for an alternative embodiment.

While the preferred embodiment of the present invention applies the tone scale function 203 to the luminance information of the original digital image 101, an alternative embodiment of the present invention applies the tone scale function 203 to each color channel of a digital image. In this alternative embodiment configuration shown in FIG. 2b, the original digital image 101 is received by the pedestal generation module 100 as a color digital image having red, green, and blue digital image channels. The pedestal generation module 100 generates a pedestal digital image 111 that is also a color digital image by processing each color channel of the color digital image. Similarly, the texture digital image 112 is also a color digital image. The tone scale function applicator 240 generates the tone scale adjusted digital image 205 by applying the tone scale function to each digital image channel of the pedestal digital image 111. The pedestal generation module 100 also produces the analysis digital image 201 as a color digital image. For this alternative embodiment of the present invention the tone scale function generator 230 receives a color digital image and generates the tone scale function 203.

Figure 3:
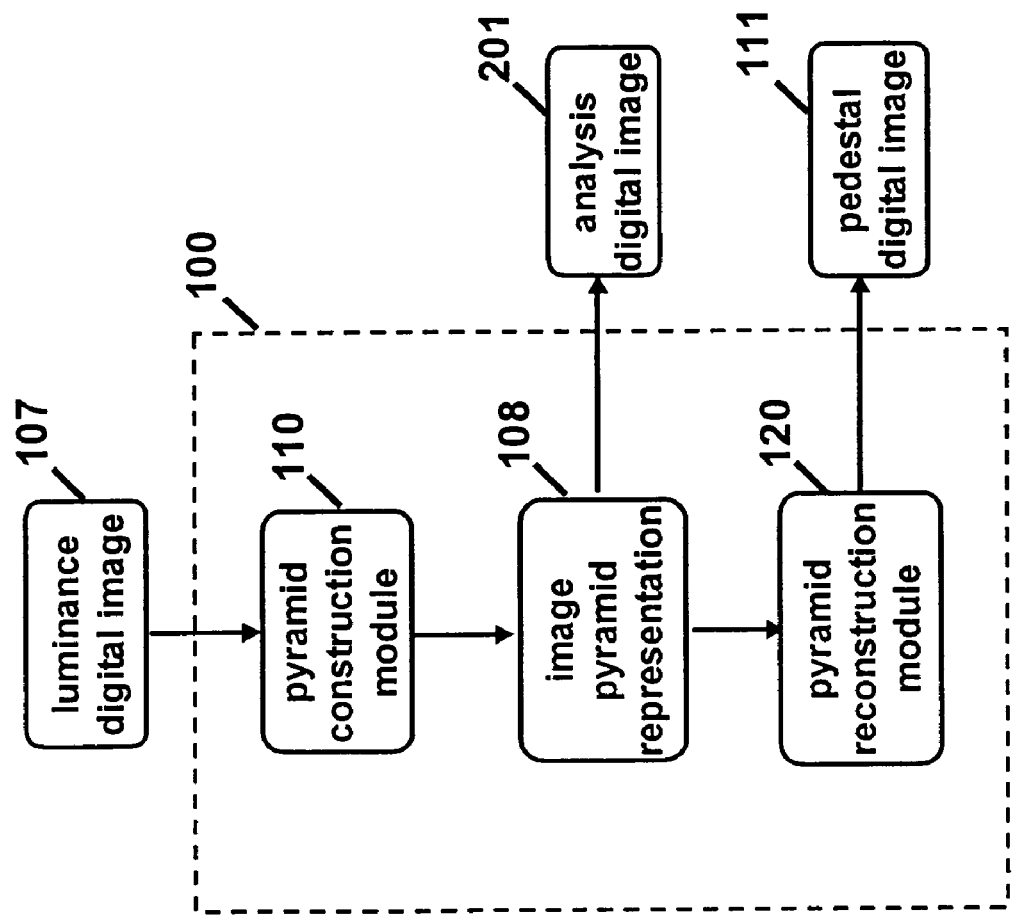
FIG. 3 is a functional block diagram showing in more detail the pedestal generation module of FIG. 2.

The pedestal generation module 100 shown in FIG. 2a is illustrated in more detail in FIG. 3. The pyramid construction module 110 receives the luminance digital image 107 and generates an image pyramid representation 108 of the luminance digital image 107, i.e. a hierarchical multiresolution representation including a plurality of base digital images and a plurality of residual digital images. Each base digital image is a lower spatial resolution version of the luminance digital image 107, each base digital image having a different spatial resolution. Each base digital image contains the same image scene content but represents the image scene content with fewer pixels than the luminance digital image. Since each base digital image in the image pyramid representation has the same scene content as the luminance digital image 107, the base digital images can be viewed on the display device and will look like the luminance digital image 107. Therefore, since the base digital images and the luminance digital image 107 have the same form, the luminance digital image can also be considered a base digital image, i.e. the base digital image of the image pyramid representation with the highest spatial resolution. The plurality of residual digital images collectively contain the high spatial frequency detail of original digital image 101. Each residual digital image has a different spatial resolution and each relates to a different pass-band of spatial frequencies. Since the residual digital images have a different form than the luminance digital image 107, the residual digital images look more like a combination of noise, texture, and edge information when viewed on a display device.

The image pyramid representation 108 is received by the pyramid reconstruction module 120 which removes texture and noise from the base digital images of the image pyramid representation 108 pixel data as a step of the image reconstruction process. The output of the pyramid reconstruction module 120 is a reconstructed digital image called the pedestal digital image 111. The pedestal digital image 111 produced by the pyramid reconstruction module 120 has the same, or nearly the same, spatial resolution as the original digital image 101 but contains much less texture and noise than the luminance digital image 107. Also shown in FIG. 3 is the analysis digital image 201. As described above, the image pyramid representation 108 includes a plurality of base digital images produced in succession and each having a lower spatial resolution than previously generated base digital image. The base digital image with a spatial resolution of approximately 64 by 96 pixels is selected as the analysis digital image 201 and transmitted to the tone scale function generator 230 shown in FIG. 2a.

Referring to FIG. 2a, the tone scale function 203 is a single valued function, i.e. one value is produced for each unique input value. The domain of the tone scale function spans the numerical range of pixel values in the pedestal digital image 111. Thus for each possible pixel value expressed in the pedestal digital image 111 there is a corresponding output pixel value as defined by the tone scale function 203. A look-up-table (LUT) is used to implement the tone scale function 203. Although the present invention can be used with non-compressive tone scale functions, the preferred embodiment primarily uses tone scale functions that achieve a dynamic range compression of the input to output pixel values. The preferred embodiment of the present invention uses the method disclosed by Lee in U.S. Pat. No. 6,285,798 B1, referenced above, to generate the tone scale function and is described in more detail hereinbelow. In particular, the tone scale function 203 is calculated from the pixels of the analysis digital image 201 and is therefore scene content dependent.

The noise content present in the enhanced digital image 102 is almost of the same magnitude as the noise content present in the original digital image 101. Thus the goal of enhancing the tone scale of the original digital image 101 without reducing the magnitude of texture and without increasing the magnitude of the noise can be achieved. Experimentation with a variety of different tone scale functions and an optimization of the texture removal method employed by the pedestal generation module 100 has shown that the optimum image quality of the enhanced digital image 102 is superior to the optimum image quality that can be achieved by applying the tone scale function 203 directly to the original digital image 101. This is especially true for compressive tone scale functions, i.e. tone scale functions that have, for part of the function domain, a low instantaneous slope.

The present invention can also be used with other types of tone scale functions. In particular, the present invention can be used with expansive tone scale functions, i.e. tone scale functions that impart an increase in the contrast of the processed digital images relative to the contrast of the luminance digital image 107. As described above, the direct application of an expansive tone scale function 203 to the original digital image 101 would result in an amplification of the noise and texture present in the luminance digital image. Thus by using the spatial filtering method of the preferred embodiment an increase in contrast can be imparted to the processed digital images without the amplification of image texture detail and noise. This is a desirable feature for some digital imaging systems, particularly for digital images that contain an excessive amount of noise.

In an alternative embodiment of the present invention, the addition module 160 adds an amplified portion of the texture digital image 112 to the tone scale adjusted digital image 205. A texture scaling factor $S_C$ is set as an application specific parameter. By varying the texture scaling factor, the amount of texture present in the enhanced digital image 102 can be controlled. Therefore, for this alternative embodiment, both a tone scale enhancement as well as a texture enhancement is achieved.

Figure 4:
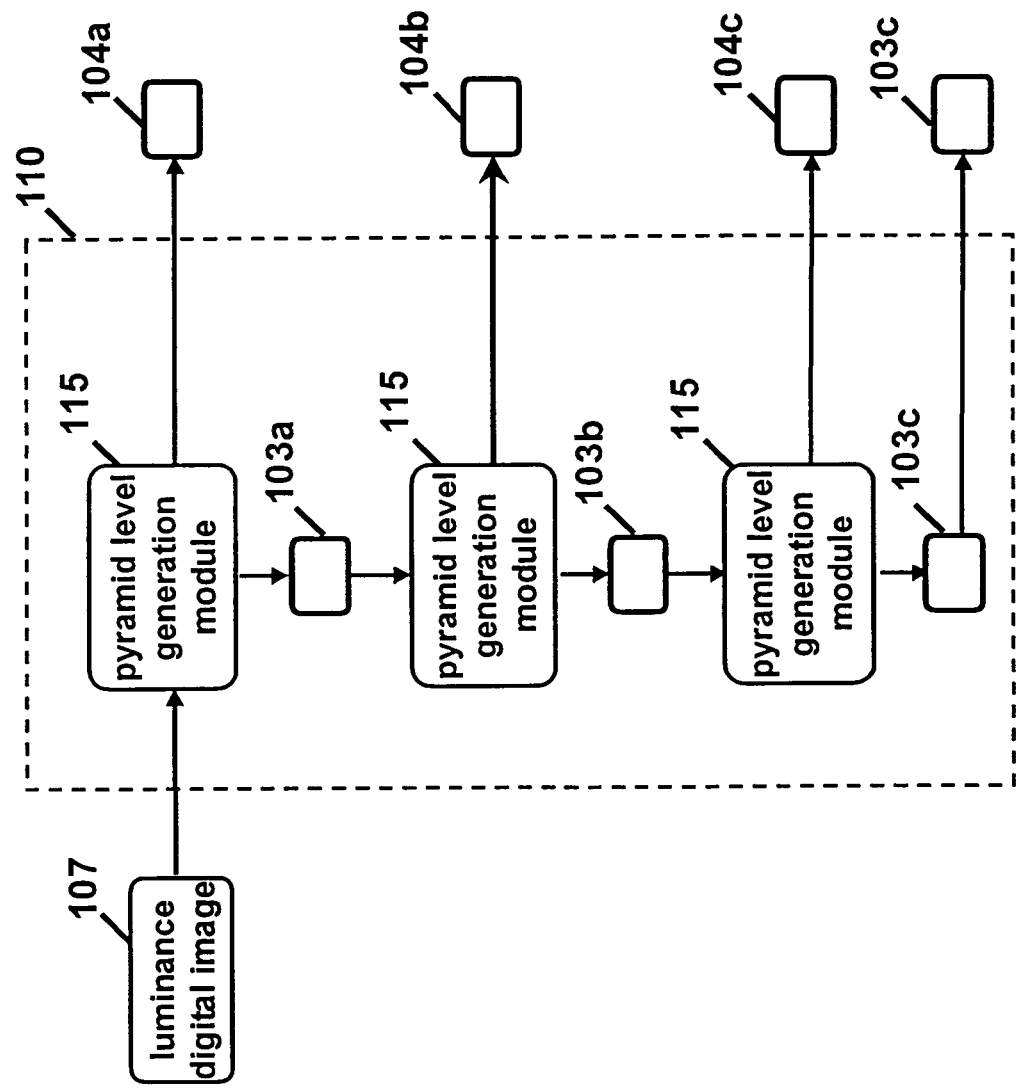
FIG. 4 is a functional block diagram showing in more detail the pyramid construction module of FIG. 3.

The pyramid construction module 110 shown in FIG. 3 is illustrated in more detail in FIG. 4. While the present invention can be used with a variety of image pyramid representations, image pyramid representations can be illustrated with the functional block diagram shown in FIG. 4. The image pyramid representation is generated by successively applying the pyramid level generation module 115 to a base digital image. The luminance digital image 107 can be considered a base digital image, i.e. the base digital image with the highest spatial resolution. The pyramid level generation module 115 receives the luminance digital image 107 as the starting input base digital image, applies a series of spatial filters to the input base digital image and generates an output base digital image. With the first application of the pyramid level generation module 115 base digital image 103a and residual digital image 104a are generated. The second application of the pyramid level generation module 115 uses the base digital image 103a as the input base digital image and generates a base digital image 103b and a residual digital image 104b. The third application of the pyramid level generation module 115 uses the base digital image 103b as the input base digital image and generates a base digital image 103c and a residual digital image 104c. Thus the image pyramid representation 108 is formed from the plurality of base digital images (103a, 103b, and 103c) and the plurality of residual digital images (104a, 104b, and 104c). Although an image pyramid representation is illustrated in FIG. 4 with four pyramid levels, i.e. the luminance digital image 107, base digital images 103a, 103b and 103c, and residual digital images 104a, 104b and 104c, the present invention can be used with image pyramid representations with a greater or lesser number of pyramid levels. The preferred embodiment of the present invention uses six pyramid levels for original digital images 101 that have approximately 1000 by 1500 pixels for each color digital image channel.

Figure 5:
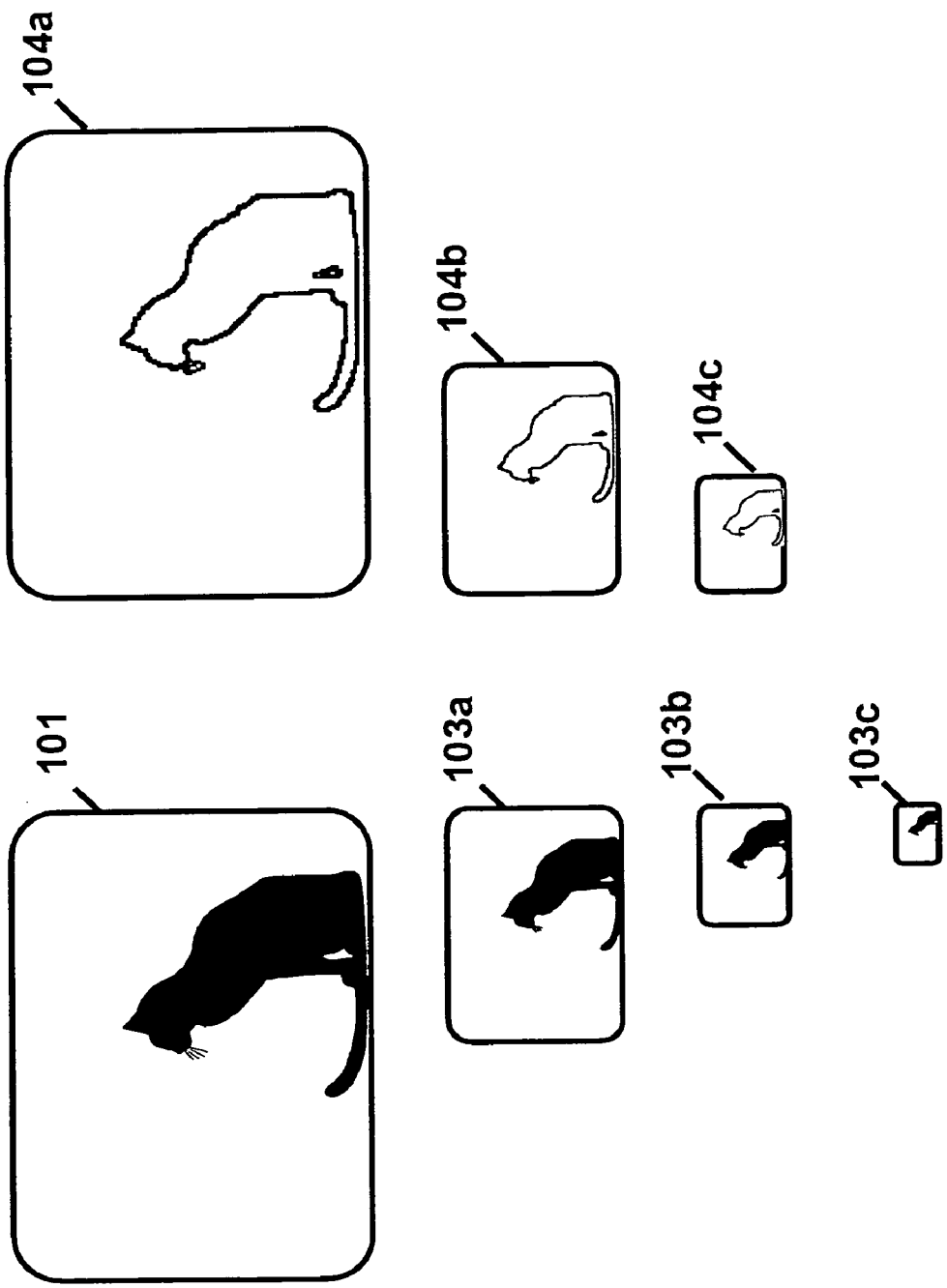
FIG. 5 is a diagram showing the relative sizes of the original digital image, the residual digital images, and the base digital images in accordance with the present invention.

Each base digital image produced by the pyramid level generation module 115 is of lower spatial resolution, (i.e. has fewer pixels) than the input base digital image. In particular, the output base digital produced by the pyramid level generation module 115 has one fourth as many pixels as the input base digital image. Each residual digital image has the same spatial resolution as the input base digital image. FIG. 5 shows a pictorial representation of the relative sizes of the base digital images and the residual digital images included in the image pyramid representation shown in FIG. 4. It is important to note that all the base digital images have the same type of pixel representation as the luminance digital image 107, i.e. each can be viewed directly on a display device 50 and will appear as a natural image. The residual digital images have a numerical mean of zero and therefore are expressed as both positive and negative numbers. The pixel content of the residual digital images represent high spatial frequency image detail wherein the image detail of the different residual digital images relate to different passband spatial frequencies.

Figure 6:
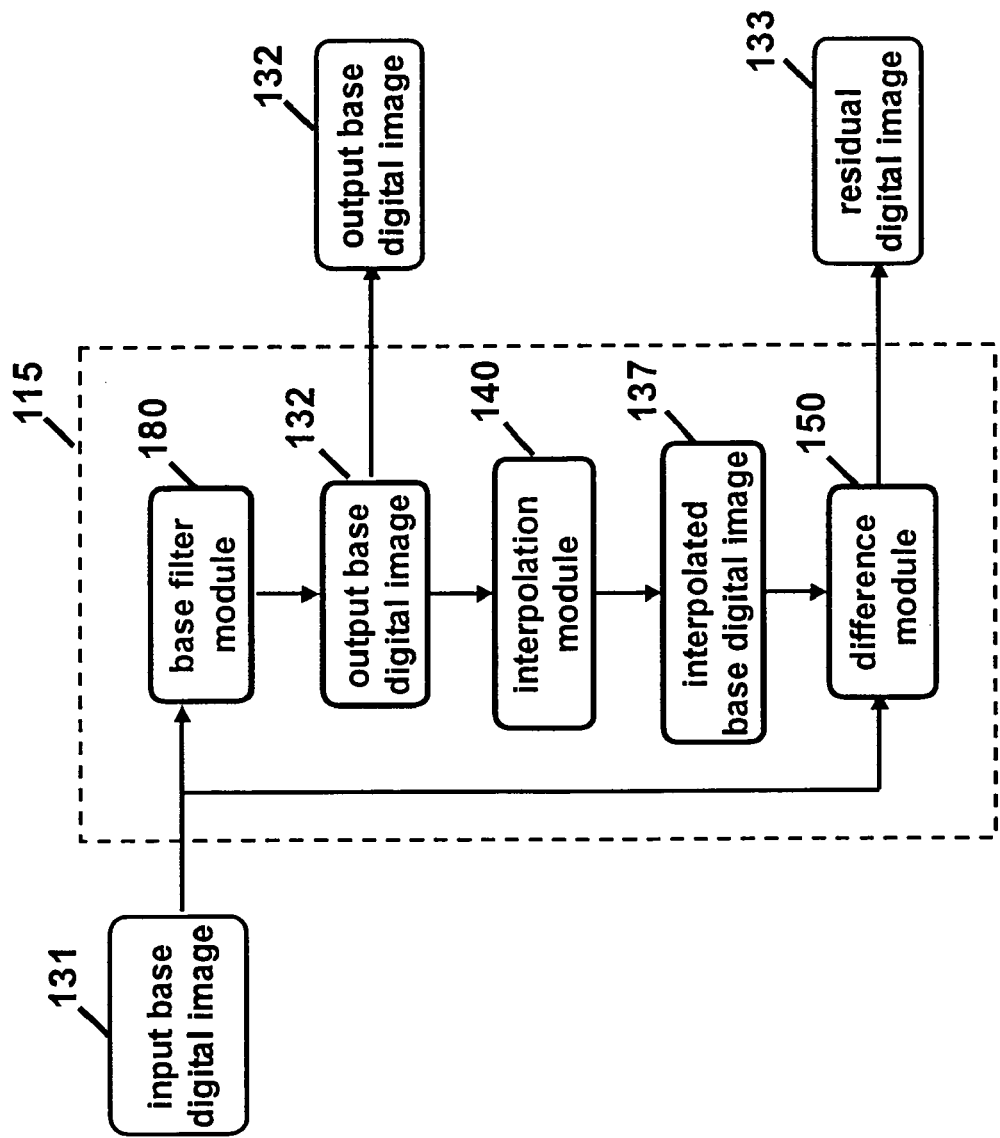
FIG. 6 is a functional block diagram showing in more detail the pyramid level generation module of FIG. 4.

The pyramid level generation module 115 shown in FIG. 4 is illustrated in more detail in FIG. 6. An input base digital image 131 is received by the base filter module 180 that applies a spatial filter to the input base digital image 131 that convolves and samples the pixel data, preserving every pixel in the $n^{th}$ row and column. Although the present invention can be practiced with sampling factors of 3 or higher, a sampling factor of 2 is preferred. The resultant output base digital image 132 is a lower spatial resolution version of the input base digital image 131, i.e. the output base digital image 132 has fewer pixels than the input base digital image 131. The output base digital image 132 is received by the interpolation module 140 which produces an interpolated base digital image 137, i.e. a higher spatial resolution version of the output base digital image 132. The interpolated base digital image 137 has the same spatial resolution as the input base digital image 131. The difference module 150 receives the interpolated digital image 137 and the input base digital image 131 and produces a residual digital image 133.

One pass through the pyramid level generation module 115 produces an output base digital image and a residual digital image. The computer memory is used to store the newly generated residual digital image 133. The interpolated base digital image 137 is discarded in computer memory since it is not needed to continue the processing. The residual digital image 133 is stored in the memory of the input base digital image 131 since the input base digital image 131 is also not needed to continue the processing. However, both the interpolated base digital image 137 and the input base digital 131 can be retained if other processes in the system need them. Therefore, the collection of the residual digital images and the lowest resolution base digital image constitutes an image pyramid representation since the luminance digital image 107 can be reconstructed from the collection of the residual digital images and the lowest resolution base digital image. The last base digital image produced is referred to as the final base digital image (103c for the example shown in FIG. 3). The collection of the all the base digital images, all the residual digital images, and the luminance digital image can also be considered an image pyramid representation.

Referring to FIG. 6, the base filter module 180 receives an input base digital image 131 and generates an output base digital image 132. As a first step in generating an output base digital image a low-pass spatial filter is convolved with the pixel data of the input base digital image 131. Since the output base digital image 132 is of lower spatial resolution than the input base digital image 131, it is not necessary to apply the low-pass spatial filter to all pixels of the input base digital image 131. The preferred embodiment of the present invention uses two one-dimensional Gaussian filters oriented orthogonally to one another as the low-pass spatial filter. The same actual spatial filter kernel data is used for both spatial orientations. The values of the one-dimensional Gaussian filter is given by equation (1) for a normalized one by five pixel spatial filter for a Gaussian standard deviation of 1.2.

$$0.0858 \quad 0.243 \quad 0.343 \quad 0.243 \quad 0.0858 \qquad (1)$$

Other values for the Gaussian standard deviation value can also yield good image quality results. A useful range is approximately form 0.6 to 2.0 pixels. For smaller values of the Gaussian standard deviation a one by three filter size may be sufficient. The spatial filtering and spatial sampling performed by the base filter module 180 is accomplished in a two pass operation. A horizontal one-dimensional Gaussian filter is convolved with the pixel data of the input base digital image 131 to produce a first pass image. In this operation, the horizontal one-dimensional Gaussian filter is applied to every other horizontal pixel. Therefore the horizontal dimension of the first pass image is one half that of the input base digital image 131 and the vertical dimension of the first pass image is equal to that of the input base digital image 131. On the second pass of the spatial filtering operation, a vertical one-dimensional Gaussian filter is convolved with the pixel data of the first pass image to produce the output base digital image 132. In this operation, the vertical one-dimensional Gaussian filter is applied to every other vertical pixel. Therefore the horizontal dimension of the output base digital image 132 is one half that of the input base digital image 131 and the vertical dimension of the base digital image is one half that of the input base digital image 131. Thus, the base filter module 180 performs both a spatial filtering operation and a spatial sampling operation by applying the Gaussian filter to selected pixels. While the preferred embodiment of the present invention uses a five element spatial filter, those skilled in the art will recognize that other Gaussian filters with a greater or fewer number of elements and non-Gaussian filters can be used and still derive benefits of the present invention.

In an alternative embodiment of the present invention a two dimensional spatial filter is used to generate the output base digital image 132. In particular a two-dimensional Gaussian spatial filter kernel is used. In this operation, the two dimensional spatial filter is applied to every other horizontal pixel and every other vertical pixel. As with the preferred embodiment of the present invention, the horizontal dimension of the output base digital image 132 is one half that of the input base digital image 131 and the vertical dimension of the output base digital image 132 is one half that of the input base digital image 131. This alternative embodiment of the present invention uses a 5 by 5 element spatial filter. Those skilled in the art will recognize that the present invention can be used with other Gaussian filters with more or less elements and non-Gaussian low-pass filters and still derive benefits of the present invention. Those skilled in the art will also recognize that the spatial sampling operation and the spatial filtering operation performed by the base filter module 180 can be separated into to distinct operations.

Referring to FIG. 6, the interpolation module 140 receives output base digital image 132 and generates an interpolated base digital image 137 of the same spatial resolution as the input base digital image 131. The operation of the interpolation module 140 is a two step process. In the first step, the pixel data from the output base digital image 132 is up-sampled to populate pixels of the interpolated base digital image. At this stage, every even pixel of every even row in the interpolated base digital image 137 has an assigned pixel value taken from the output base digital image 132. Also, every odd pixel of every even row in the interpolated base digital image 137 does not have an assigned value nor does every pixel of every odd row. A bi-linear interpolation method is used to generate the missing pixel values. For every odd pixel of every even row in the interpolated base digital image 137 the average of the two nearest horizontal pixel values is used to assign the missing pixel value. Similarly, for every even pixel of every odd row in the interpolated base digital image 137 the average of the two nearest vertical pixel values is used to assign the missing pixel value. Lastly, for every odd pixel of every odd row in the interpolated base digital image, the average of the two nearest horizontal pixel values is used to assign the missing pixel value. This is mathematically equivalent to using the nearest two vertical pixel value or using the nearest four sampled pixel values from the output base digital image 132. Those skilled in the art will recognize that operation of the interpolation module 140 does not need to be performed as separate steps. It is also possible to implement in a one step process both the up-sampling and interpolation procedures.

The essential aspect of the interpolation filter used is the generation of an interpolated base digital image of the same resolution as the input base digital image 131. The bi-linear interpolation filter is used for its computational efficiency and overall acceptable quality. The present invention can be practiced with other interpolation filters. In an alternative embodiment of the present invention a bi-cubic interpolation filter is used as described by Press et al. their publication "Numerical Recipes" produced by the Cambridge University Press, pp. 98–101. Although the bi-cubic interpolation filter generally produces higher quality results as compared with the bi-linear interpolation filter, more pixels must be used from a local neighborhood of pixels to generate the missing pixel values thus requiring more computational resources.

The interpolation module 140 described above is used for both the pyramid construction processing as well as the pyramid reconstruction processing. The action of the interpolation module 140 is the same in either case. However, the resultant image produced by the interpolation module 140 shall be called the interpolated base digital image 137 for the pyramid construction process since a pedestal filter has not been applied to the base digital image. Similarly for the pyramid reconstruction process, the result of the interpolation module 140 shall be called the interpolated pedestal base digital image since a pedestal filter has been applied to the base digital image. It should also be noted for clarity that the interpolation module 140 always produces an output digital image of higher spatial resolution than the digital image it receives.

Figure 7A:
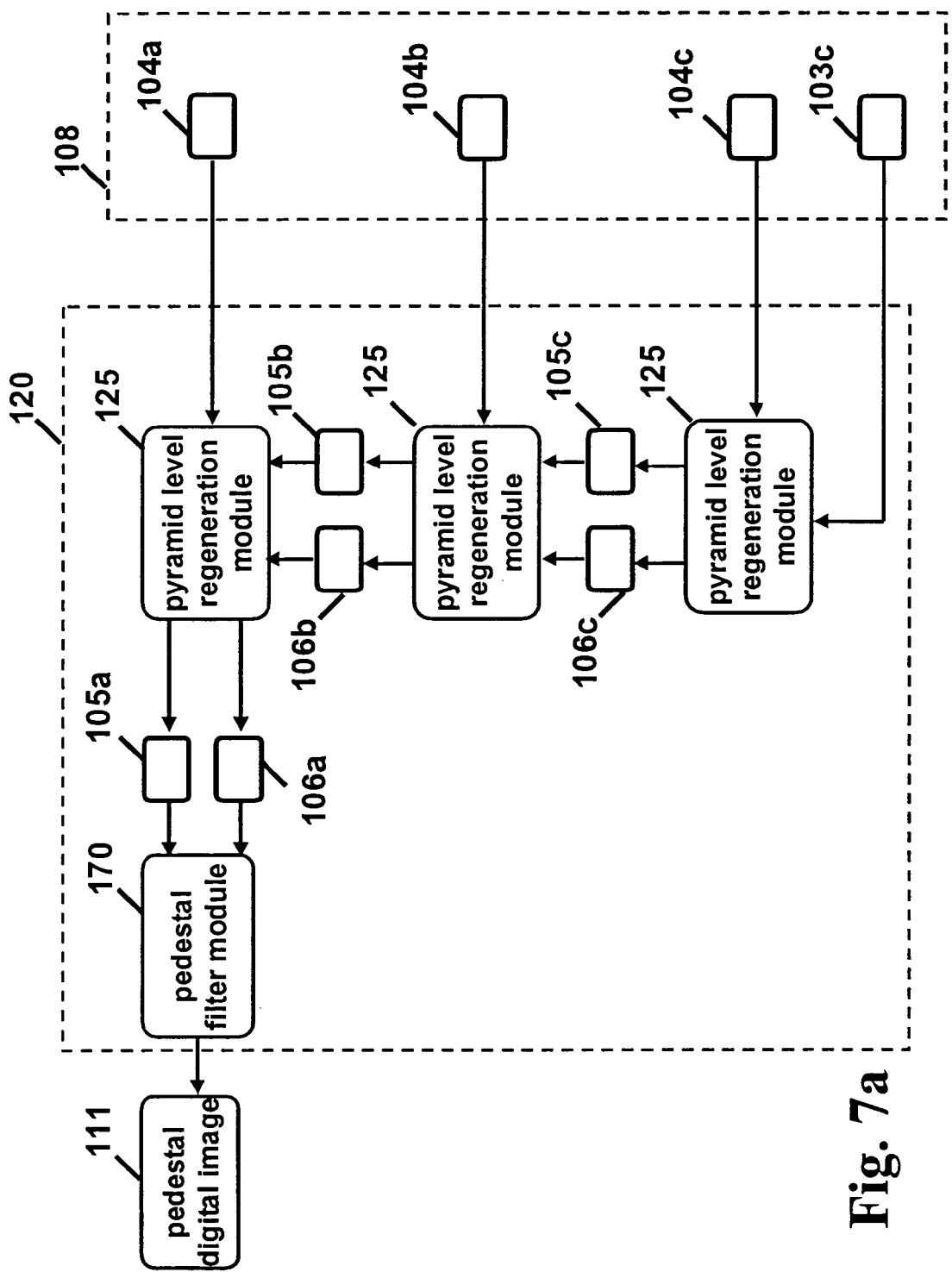
FIG. 7a is a functional block diagram showing in more detail the pyramid reconstruction module of FIG. 3 for the preferred embodiment of the present invention.

The pyramid reconstruction module 120 shown in FIG. 3 is illustrated in more detail in FIG. 7a. The image pyramid representation 108 shown in FIG. 3 is received by the pyramid reconstruction module 120, shown as components 104a, 104b, 104c, and 103c, which produces a pedestal digital image 111 by successively applying the pyramid level regeneration module 125 to a base digital image. The pyramid level regeneration module 125 receives the final base digital image as the starting input base digital image 103c, i.e. the lowest base digital image of the image pyramid representation, and the residual digital image 104c (the lowest spatial resolution residual digital image) and generates a texture reduced base digital image 105c. The texture reduced base digital image 105c is of the same spatial resolution as the residual digital image 104c.

As part of the application of the pyramid level regeneration module 125 is the generation of the masking digital image 106c. The masking digital image 106c is generated from the input base digital image 103c and used in the process of removing texture. The second application of the pyramid level regeneration module 125 uses the texture reduced base digital image 105c as the input base digital image, masking digital image 106c and residual digital image 104b (the next higher spatial resolution residual digital image) and generates texture reduced base digital image 105b and masking digital image 106b. The masking digital image 106b is generated within the pyramid level regeneration module 125 from the masking digital image 106c and the texture reduced base digital image 105b (described in more detail hereinbelow). The third application of the pyramid level regeneration module 125 uses the texture reduced base digital image 105b as the input base digital image, masking digital image 106b, and residual digital image 104a and generates texture reduced base digital image 105a and masking digital image 106a. The texture reduced base digital image 105a and masking digital image 106a are received by the pedestal filter module 170 which produces the pedestal digital image 111. In the preferred embodiment of the present invention, a pedestal filter is also used as part of the processing within the pyramid level regeneration module 125. Thus the reconstructed digital image, the texture reduced base digital image 105a and the masking digital image 106a are of the same spatial resolution as the luminance digital image 107.

Figure 8A:
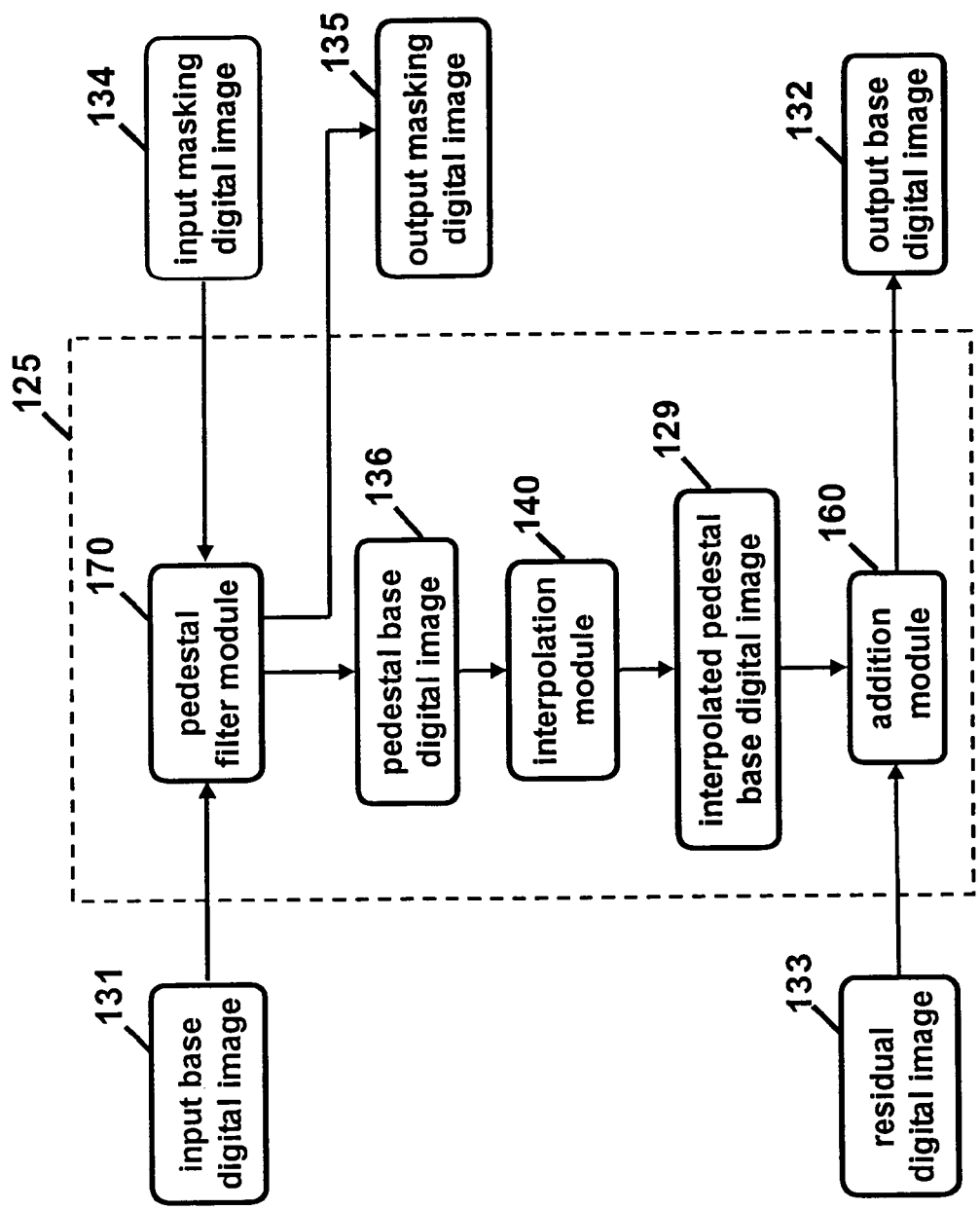

The pyramid level regeneration module 125 shown in FIG. 7a is illustrated in more detail in FIG. 8a. The pedestal filter module 170 receives and processes the input base digital image 131 to produce a pedestal base digital image 136. The pedestal filter module 170 removes texture and noise from the input base digital image 131 with the application of a pedestal filter, or texture reducing spatial filter, which also uses the input masking digital image 134. The input masking digital image 134 is used to identify edge regions and textured regions within the input base digital image 131. The interpolation module 140 receives the pedestal base digital image 136 and produces an interpolated pedestal base digital image 129. Also produced by the pedestal filter module 170 is the output masking digital image 135. The addition module 160 receives the interpolated pedestal base digital image 129 and the residual digital image 133 and generates an output base digital image 132. The addition module 160 and the difference module 150 perform inverse functions of one another. The difference module 150 numerically subtracts the corresponding pixels of the two digital images it receives. The addition module 160 adds together the two digital images it receives. Those skilled in the art will recognize that the present invention can be practiced with other difference modules and addition modules. However, if different methods are used for the difference module 150 and the addition module 160, the best results will be obtained if the functions these two modules performs are mathematical inverses of one another.

Several aspects of the texture removal process should be noted. Since the pedestal filter module 170 is applied to a base digital image, and a base digital image has the same pixel representation as the original digital image 101, the present invention can be practiced with any pedestal filter that can receive and process the luminance digital image 107. Furthermore, although the present can use the same pedestal filter at each pyramid level, or pass through the pedestal filter module 170, this is not a requirement. Thus, different pedestal filters can be used for the different pyramid levels. This can yield texture removal performance advantages if the texture characteristics for a particular source of digital images varies as a function of spatial frequency.

Another important aspect of the present invention relates to the flexibility of different spatial resolutions of pedestal digital images produced. Since base digital images 103a, 103b, and 103c (shown in FIG. 4.) are produced with successively smaller spatial resolution, any of the corresponding pedestal based digital images produced by the pyramid reconstruction module 120 can be saved in computer memory for use as output or received by another digital imaging application for further processing. Therefore, the present invention can be used for digital imaging applications that make use of a pedestal digital image of lower resolution than the original digital image 101. It is also possible to use the present invention in a mode in which the final processed digital image is of lower spatial resolution than the original digital image 101.

An alternative embodiment of the present invention employs an implementation of the pyramid reconstruction module 120 which does not include masking digital images communicated between pyramid levels. In this alternative embodiment, the masking digital images shown in FIG. 7a are generated and used within the pyramid level regeneration module 125. For each application of the pyramid level regeneration module 125, the masking digital images are derived just from the input base digital image. The functional block diagram for this alternative embodiment are shown in detail in FIG. 7b for completeness. Notice that the functional block diagram is the same as for the preferred embodiment shown in FIG. 7a except for the omission of items 106c, 106b, and 106a.

Figure 7B:
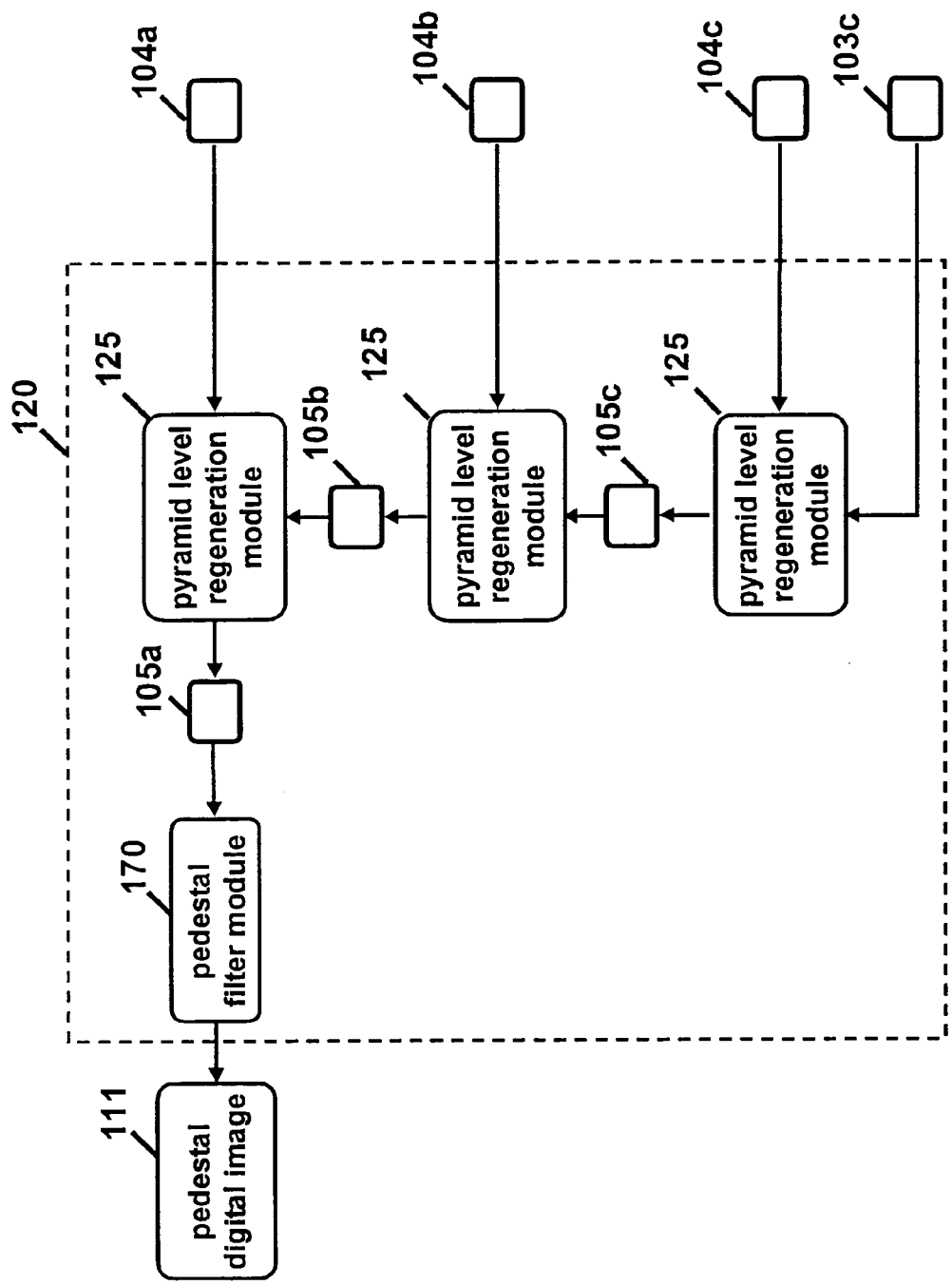
FIG. 7b is a functional block diagram showing in more detail the pyramid reconstruction module of FIG. 3 for an alternative embodiment of the present invention.
Figure 8B:
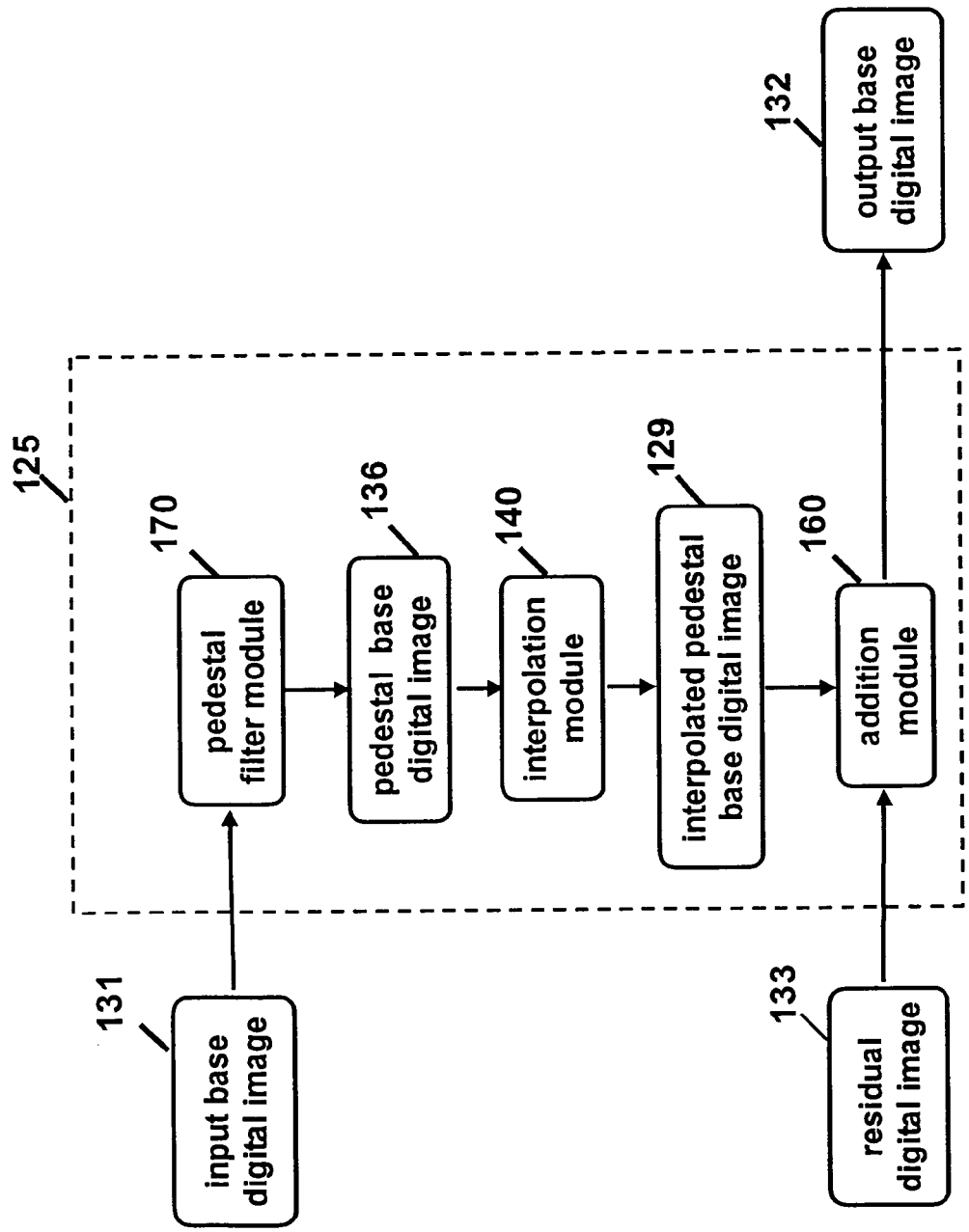
FIG. 8b is a functional block diagram showing in more detail the pyramid level regeneration module of FIG. 7b for the alternative embodiment.

The pyramid level regeneration module 125 for the alternative embodiment of the present invention depicted in FIG. 7b is illustrated in more detail in FIG. 8b. In this alternative embodiment, the masking digital images shown in FIG. 8a are generated and used within the pedestal filter module 170. Notice that the functional block diagram shown in FIG. 8b is the same as for the preferred embodiment shown in FIG. 8a except for the omission of the input masking digital image 134 and the output masking digital image 135.

Figure 9A:
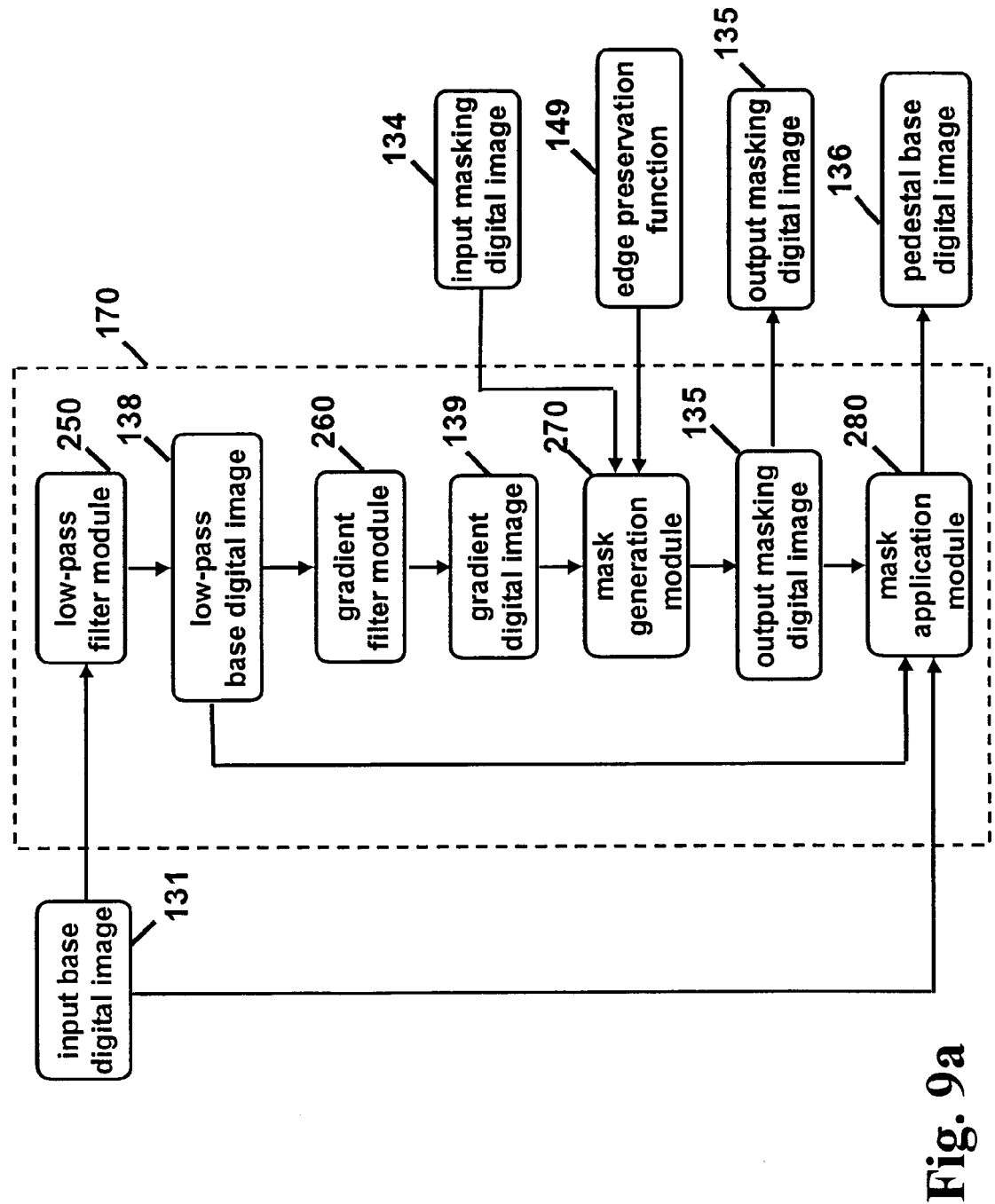

The pedestal filter module 170 shown in FIG. 8a is illustrated in more detail in FIG. 9a and is an implementation of a pedestal filter or texture reducing spatial filter. Through a series of operations, edge detail contained in the input base digital image 131 is identified and preserved in the pedestal base digital image 136 while at the same time texture is removed, (image content related to fine spatial detail) and noise is removed (stochastic variation in pixel values). The edge preserving texture and noise removing property of the pedestal filter module 170 is achieved through the use of a control signal, referred to as a masking digital image. A masking digital image that is derived from the image pixel data and used to differentiate image edge structure from image texture structure is an important feature of the present invention.

The output masking digital image 135 is generated by first applying a low-pass filter to the input base digital image 131 shown by low-pass filter module 250. The low-pass base digital image 138 is generated in the process and is received by the gradient filter module 260. Although a variety of different gradient filters can be used, the preferred embodiment of the present invention uses two one-dimensional Prewitt spatial filters to generate a vertical and a horizontal gradient value for each input pixel value given by equation (2) and (3)

$$\begin{matrix} -1 & 0 & 1 \\ -1 & 0 & 1 \\ -1 & 0 & 1 \end{matrix} \quad (2)$$

$$\begin{matrix} -1 & -1 & 1 \\ 0 & 0 & 0 \\ 1 & 1 & 1 \end{matrix} \quad (3)$$

respectively. The horizontal ($\eta$) and vertical gradient ($\phi$) values are combined in to a gradient magnitude value ($\Gamma$) using equation (4) with $$\Gamma = (\eta^2 + \phi^2)^{1/2} \quad (4)$$

the gradient magnitude values constituting the pixel values of the gradient digital image 139.

In an alternative embodiment, the Sobel gradient spatial filters are used to calculate the gradient magnitude value are given by (5) and 6) for the horizontal and vertical components respectively.

$$\begin{matrix} -1 & 0 & 1 \\ -2 & 0 & 2 \\ -1 & 0 & 1 \end{matrix} \quad (5)$$

$$\begin{matrix} -1 & -2 & 1 \\ 0 & 0 & 0 \\ 1 & 2 & 1 \end{matrix} \quad (6)$$

Figure 10:
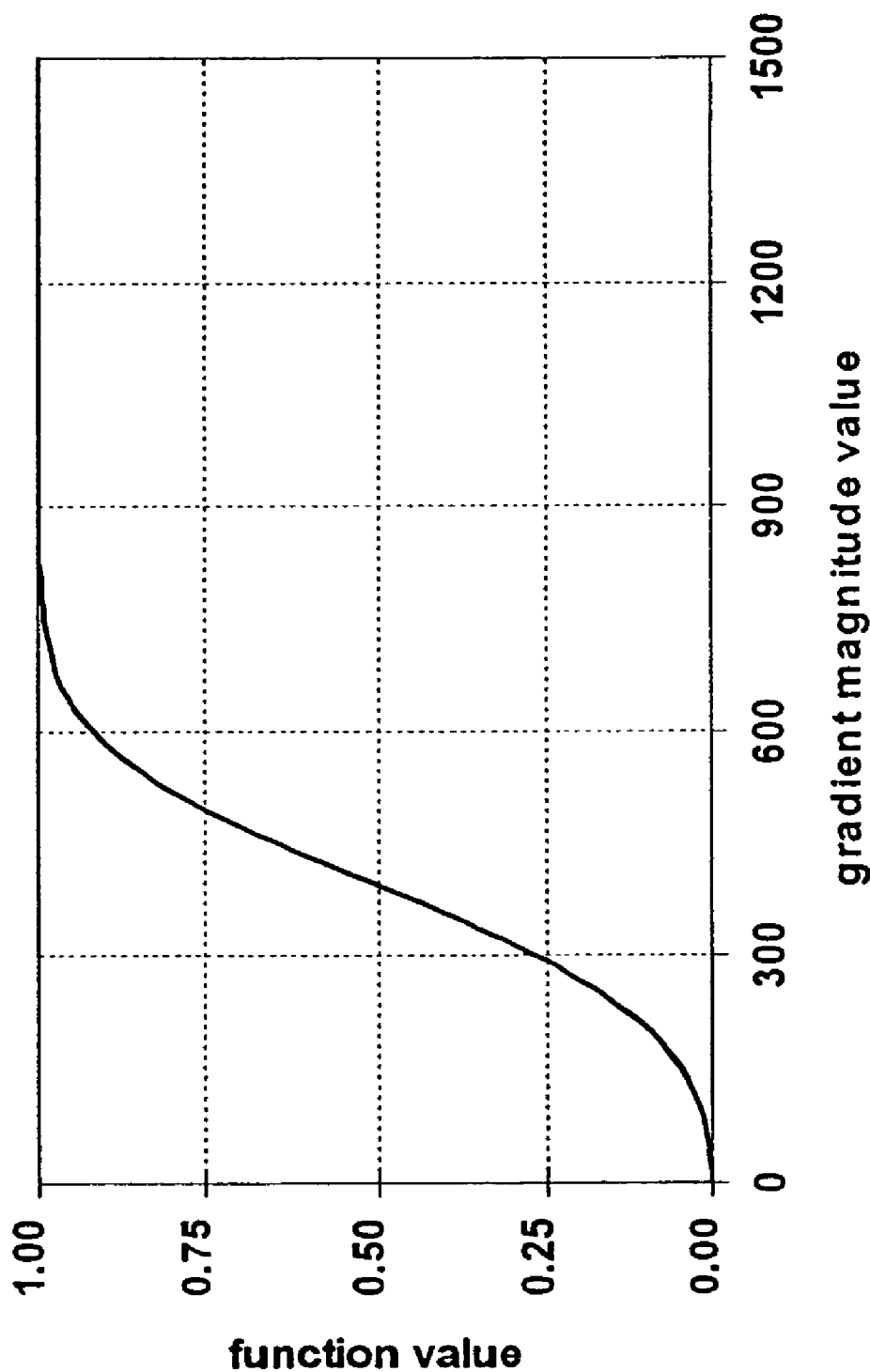
FIG. 10 is a graph illustrating an example of the edge preservation function.

The mask generation module 270 receives the gradient digital image 139 and the edge preservation function 149 and generates a first masking digital image. The edge preservation function 149 is applied to the pixels of the gradient digital image 139. In this process, the gradient magnitude values are scaled between 0.0 and 1.0 and represent a control signal value. A graph of the edge preservation function is shown in FIG. 10. Small amplitude gradient magnitude values result in control signal values close to 0.0 while large amplitude gradient magnitude values result in control signal values close to 1.0. There are other mathematical forms of the edge preservation function 149 that can produce acceptable results, however, the preferred embodiment of the present invention uses an integral-of-a-Gaussian formulation to generate the edge preservation function 149. The example edge preservation function shown in FIG. 10 was generated using a Gaussian function with a standard deviation value of 150.0 and an offset parameter of 400.0. Excellent experimental results have been obtained using the same edge preservation function at each pyramid level of processing. However, for some digital imaging applications it may be desirable to change the edge preservation function for different pyramid levels. For example, the Gaussian standard deviation and offset parameters can be varied with pyramid level to change the character of the pedestal digital image 111.

Some embodiments of the mask generation module 270 derive the output masking digital image 135 from the gradient digital image 139 and edge preservation function 149 without using an input masking digital image 134. For these embodiments, the output masking digital image 135 is the calculated first masking digital image. The output masking digital image 135 has a value of 0 for non-edge regions of the base digital image and a value of 1.0 for edge regions. The output masking digital image digital image 135 identifies the edge regions in the corresponding base digital image 131.

The mask generation module 270 shown in FIG. 9a receives and uses the input masking digital image 134 in the process of generating the output masking digital image 135. This implementation of the mask generation module 270 calculates the pixel values of the output masking digital image 135 as a combination of the first masking digital image pixel values with the input masking digital image pixel values. Depending on the embodiment, the input masking digital image 134 can be of lower spatial resolution than the first masking digital image. For these embodiments, the input masking digital image 134 is processed with the interpolation module 140 (previously described with reference to FIG. 6) to produce a input masking digital image is the same spatial resolution as the first masking digital image. There is more than one way to combine the two masking digital images. The first masking digital image pixel values and input masking digital image pixel values can be combined multiplicatively. This results in a masking digital image that relates to a logical AND operation. The two masking pixel values can also be combined by taking an average or by taking the greater of the two or the lesser of the two. Another method of combining the two masking pixel values is to add the two values and bounding the result by 0.0 and 1.0.

Image content information relating to edge structures is exhibited in almost all levels of the image pyramid representation. Therefore, the masking digital image used at each pyramid level should relate to edge information at that pyramid level. However, for some images, the edge information is more and less detectable at different pyramid levels. In another embodiment of the present invention, the masking digital image from one pyramid level is used to modify the masking digital image generated at the next pyramid level. For each pixel in the base digital image being processed, the pixel value is used vary the edge preservation function E( ) described above. The input masking digital image pixel value $M_{ij}$ is used to scale the gradient pixel value $\Gamma_{ij}$ that is use to generate the output masking digital image pixel value $M'_{ij}$ given by (7).

$$M'_{ij} = E(\Gamma_{ij}(M_{ij}/0.33)) \quad (7)$$

The mask application module 280 receives the input base digital image 131, the low-pass base digital image 138, and the output masking digital image 135 and generates the pedestal base digital image 136. The pixel values of the pedestal base digital image 136 ($Pb_{ij}$) are calculated by using the pixels of the output masking digital image 135 ($\mu_{ij}$) as a control signal, i.e. a multiplicative factor that regulates a signal. The pixels of the pedestal base digital image 136 are given by (8)

$$PB_{ij} = \mu_{ij} IB_{ij} + (1.0 - \mu_{ij}) LP_{ij} \quad (8)$$

where $IB_{ij}$ represents the pixel value of the $ij^{th}$ input base digital image 131 and $LP_{ij}$ represents the pixel value of $ij^{th}$ low-pass base digital image 138. By inspection of (6) it can be seen that the pixels of the pedestal base digital image 136 retains the edge detail of the input base digital image 131 due to the action of the output masking digital image 135 since the output masking digital image 135 has a value close to 1.0 for edge regions detected by the spatial filter described by (2), (3) and (4). Similarly, the pedestal base digital image 136 does not retain the texture and noise detail of the input base digital image 131 since the output masking digital image 135 has a value close to 0.0 for texture and noise regions. Thus the pixel values of the pedestal base digital image 136 are a non-linear function of the pixel values of the input base digital image 131.

Figure 9B:
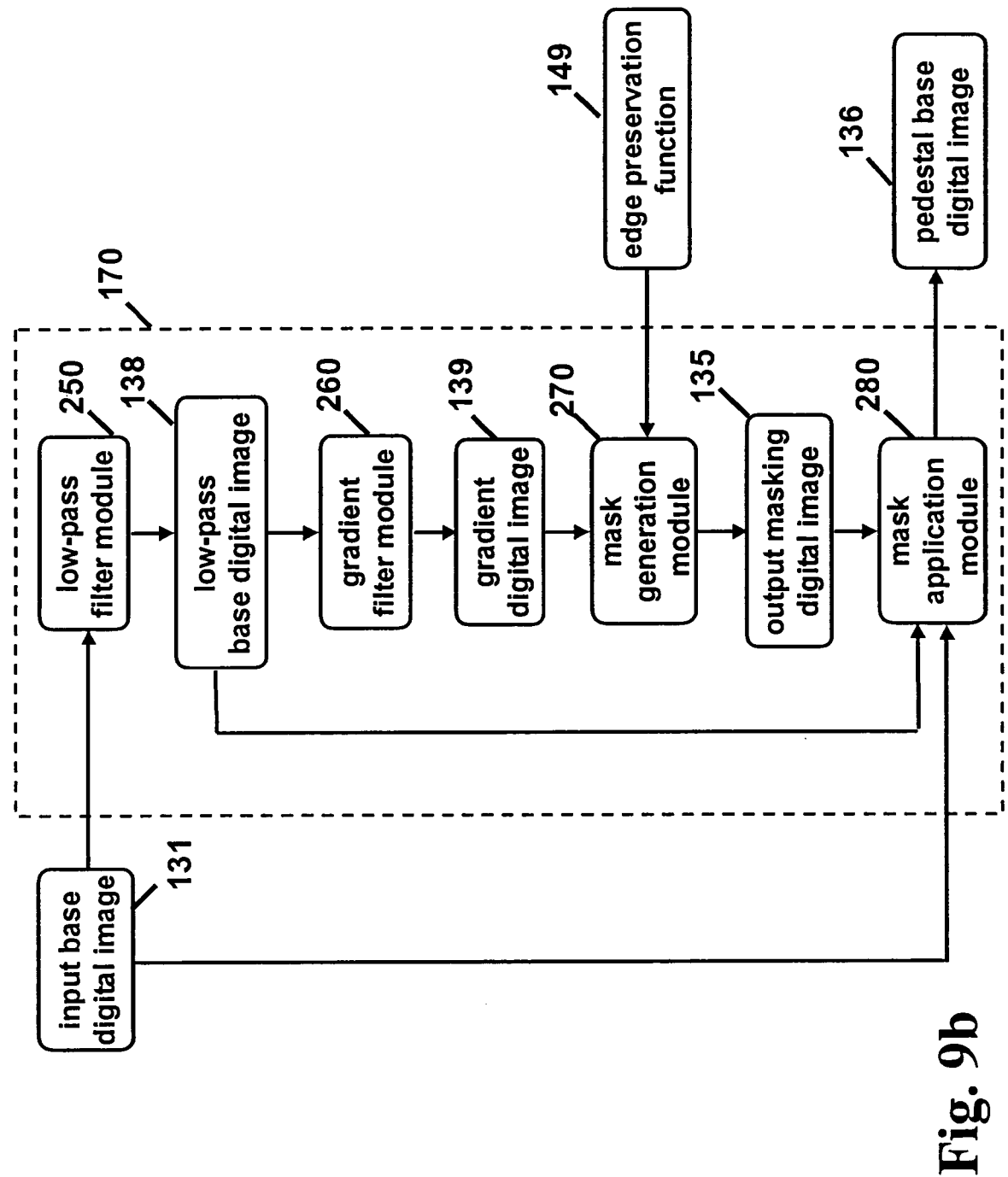
FIG. 9b is a functional block diagram of the pedestal filter module of FIG. 8a for an alternative embodiment.

An alternative embodiment of the pedestal filter module 170 shown in FIG. 8b is illustrated in more detail in FIG. 9b. This alternative embodiment is essentially the same as the preferred embodiment shown in FIG. 9a with the elimination of the input masking digital image as an input to the mask generation module 270. In this alternative embodiment shown in FIG. 9b, the mask generation module 270 generates the output masking digital image 135 by directly applying the edge preservation function 149 to the pixels of the gradient digital image 139. For this alternative embodiment, the modules 250, 260, and 280 perform the same functions with the same inputs as in the preferred embodiment.

Figure 9C:
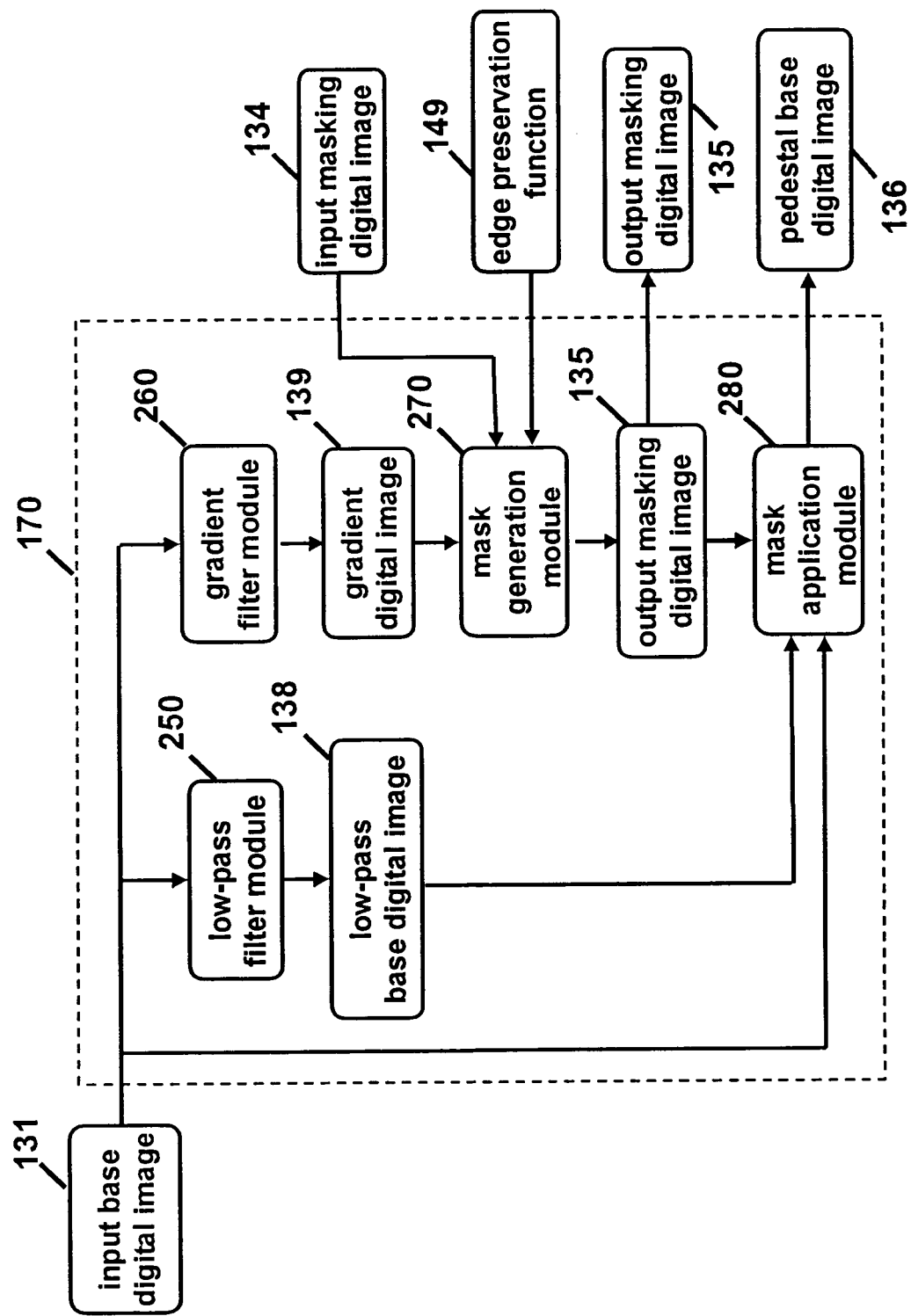
FIG. 9c is a functional block diagram of the pedestal filter module of FIG. 8a for another alternative embodiment.

Another alternative embodiment of the pedestal filter module 170 shown in FIG. 8a is illustrated in more detail in FIG. 9c. For this alternative embodiment, the logic and flow of information is nearly identical with the preferred embodiment depicted in FIG. 9a with the exception of the exception of the gradient filter module 260 which generates the gradient digital image 139 from the input base digital image 131 and not from the low-pass base digital image 138 as in the preferred embodiment. For this alternative embodiment, the other modules 270, 280, and 250 perform the same functions with the same inputs as in the preferred embodiment.

Figure 9D:
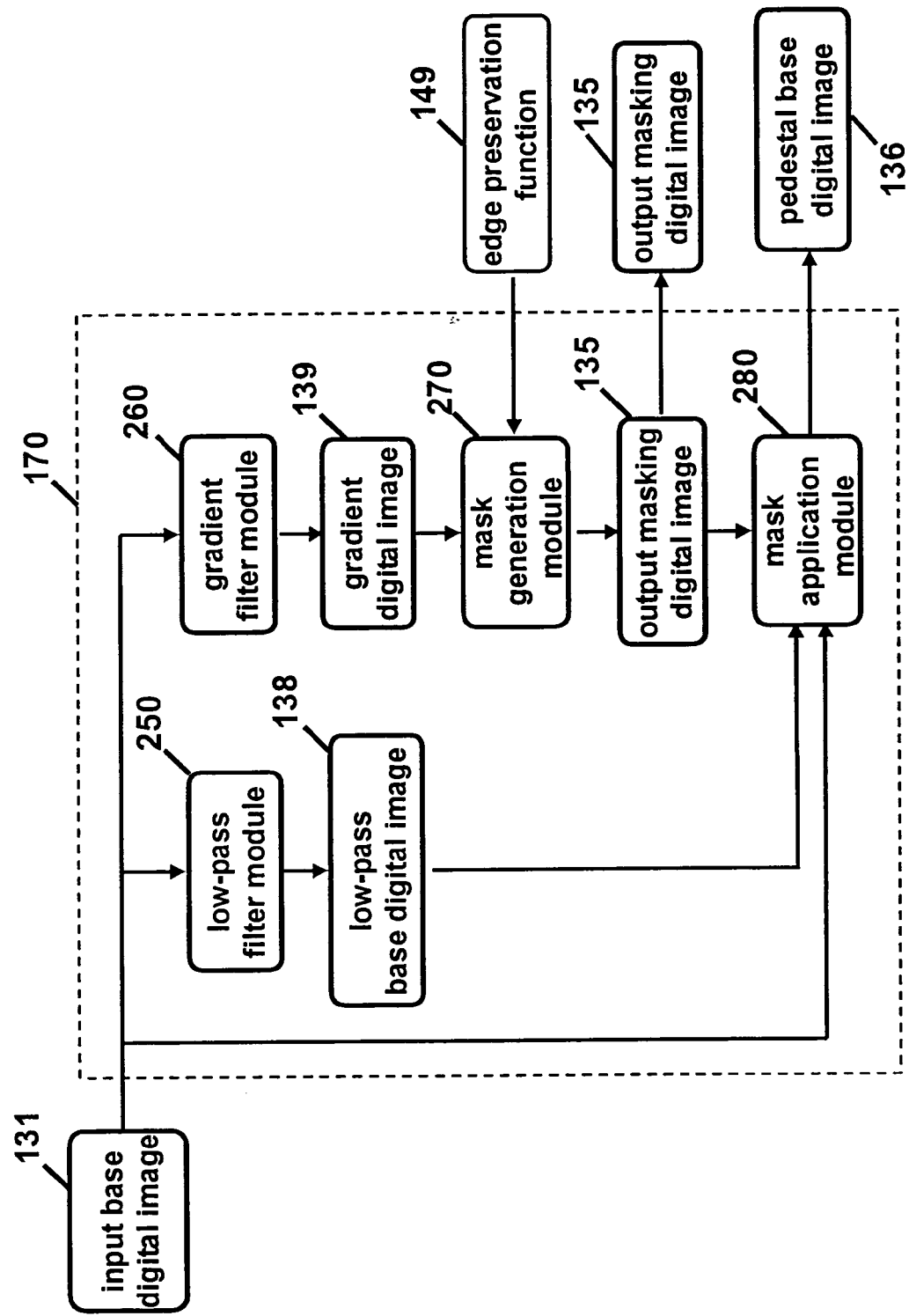
FIG. 9d is a functional block diagram of the pedestal filter module of FIG. 8a for another alternative embodiment.

In a still further alternative embodiment of the pedestal filter module 170 shown in FIG. 8b is illustrated in more detail in FIG. 9d. For this alternative embodiment, the logic and flow of information is nearly identical with the alternative embodiment depicted in FIG. 9b with the exception of the gradient filter module 260 which generates the gradient digital image 139 from the input base digital image 131 and not from the low-pass base digital image 138 as in the alternative embodiment shown in FIG. 9b. For this alternative embodiment, the other modules 270, 280, and 250 perform the same functions with the same inputs as in the alternative embodiment shown in FIG. 9b.

Figure 11:
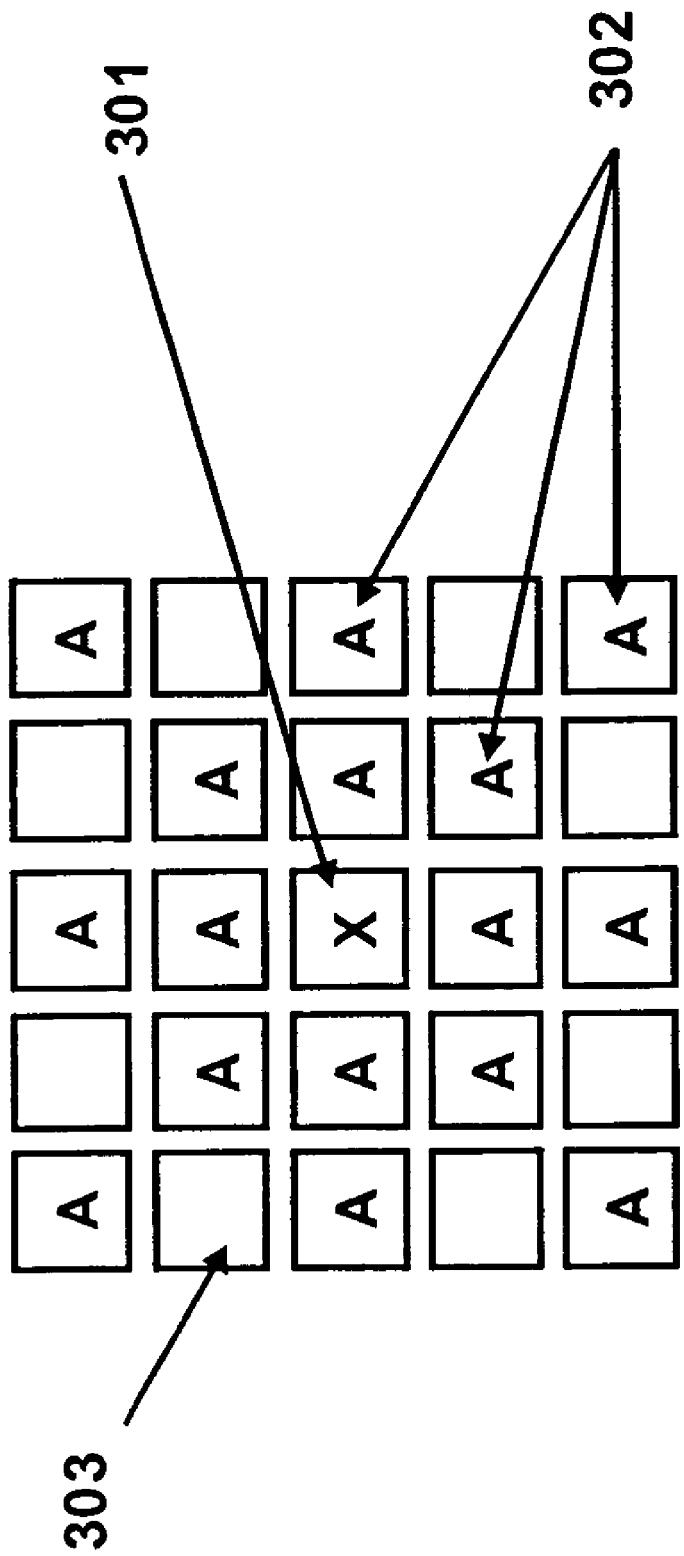
FIG. 11 is a diagram of the pixels geometry employed by a sigma filter for an alternative embodiment.

Referring to FIG. 8a, the pedestal filter module 170 receives an input base digital image 131 and generates a pedestal base digital image 136 by applying a pedestal filter, or texture reducing spatial filter to the pixels of the base digital image. The pedestal filter module 170 can use any texture reducing spatial filter. In a still further alternative embodiment of the present invention a modified implementation of the Sigma filter, described by Jong-Sen Lee in the journal article *Digital Image Smoothing and the Sigma Filter*, Computer Vision, Graphics, and Image Processing Vol 24, pp. 255–269, 1983, is employed as a pedestal filter. The values of the pixels contained in a local neighborhood of w by w pixels where w denotes the length of pixels in either the row or column direction, are compared with the value of the center pixel, or pixel of interest. Each pixel in the local neighborhood of pixels is given a weighting factor of one or zero based on the absolute difference between the value of the pixel of interest and the local pixel value, i.e. a difference pixel value. If the absolute value of the pixel value difference is less or equal to a threshold value $\epsilon$, the weighting factor is set to one; otherwise, the weighting factor is set to zero. The numerical constant $\epsilon$ must be tuned to remove texture. Each digital imaging system can be used with different numerical ranges of pixel values. An optimum value for $\epsilon$ has been experimentally determined to relate to the equivalent of one photographic stop, or a factor of two intensity. Mathematically the expression for the calculation of a texture reduced pixel value is given as (9)

$$q_{mn} = \Sigma_{ij} a_{ij} p_{ij} / \Sigma_{ij} a_{ij} \qquad (9)$$

and $$a_{ij} = 1 \text{ if } |p_{ij} - p_{mn}| <= \epsilon$$

$$a_{ij} = 0 \text{ if } |p_{ij} - p_{mn}| > \epsilon$$

where $p_{ij}$ represents the $ij^{th}$ pixel contained in the local neighborhood of pixels, $p_{mn}$ represents the value of the pixel of interest located at row m and column n, $a_{ij}$ represents a weighting factor, and $q_{mn}$ represents the noise reduced pixel value. Typically, a local neighborhood of pixels centered about the center pixel is used with the indices i and j varying to sample the local pixel values for Sigma filter applications. A radial pattern of pixels within an w by w the local neighborhood of pixels is used as illustrated in FIG. 11. The pixel of interest 301 is shown in the center with local pixels 302 shown in a radial pattern about the pixel of interest 301. The pixel locations 303 shown without letter designations are not used in the calculation of the texture reduced pixel values. The texture reduced pixel values form the pixel values of a pedestal digital image.

Figure 12:
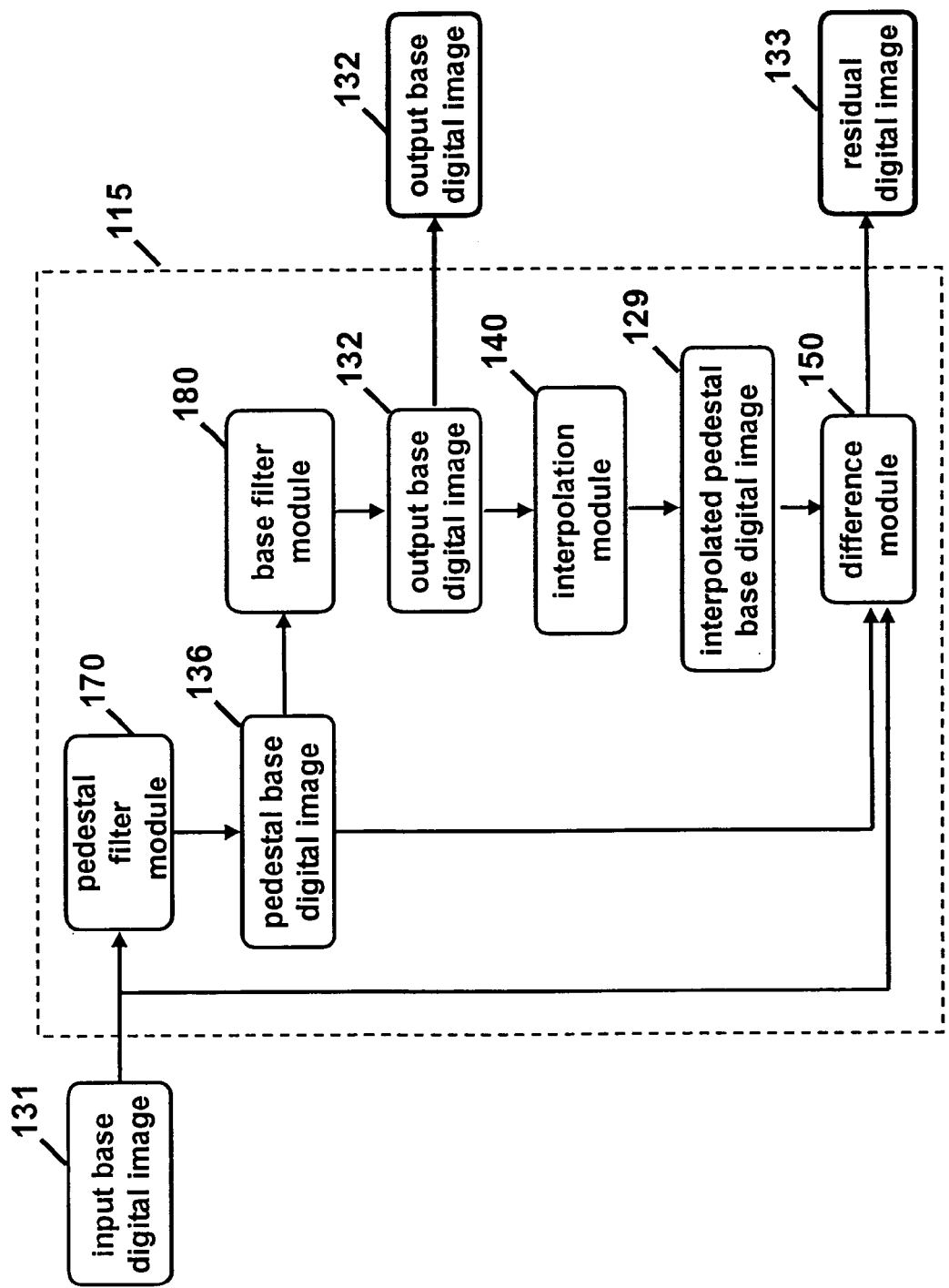
FIG. 12 is a functional block diagram showing in more detail the pyramid level generation module of FIG. 4 for an alternative embodiment.

The pyramid level regeneration module 125 described above employs the pedestal filter during the pyramid reconstruction phase of the processing. It is also possible to employ the texture and noise removal processing during the pyramid construction phase of the processing. Referring to FIG. 12, the pedestal filter module 170 receives the input base digital image 131 and generates a pedestal base digital image 136. The base filter module 180 receives the pedestal base digital image 136 and generates the output base digital image 132. The interpolation module 140 receives the output base digital image 132 and generates the interpolated base digital image 129. Finally the difference module 150 receives both the pedestal base digital image 136 and the input base digital image 131 and generates the residual digital image 133.

Figure 13:
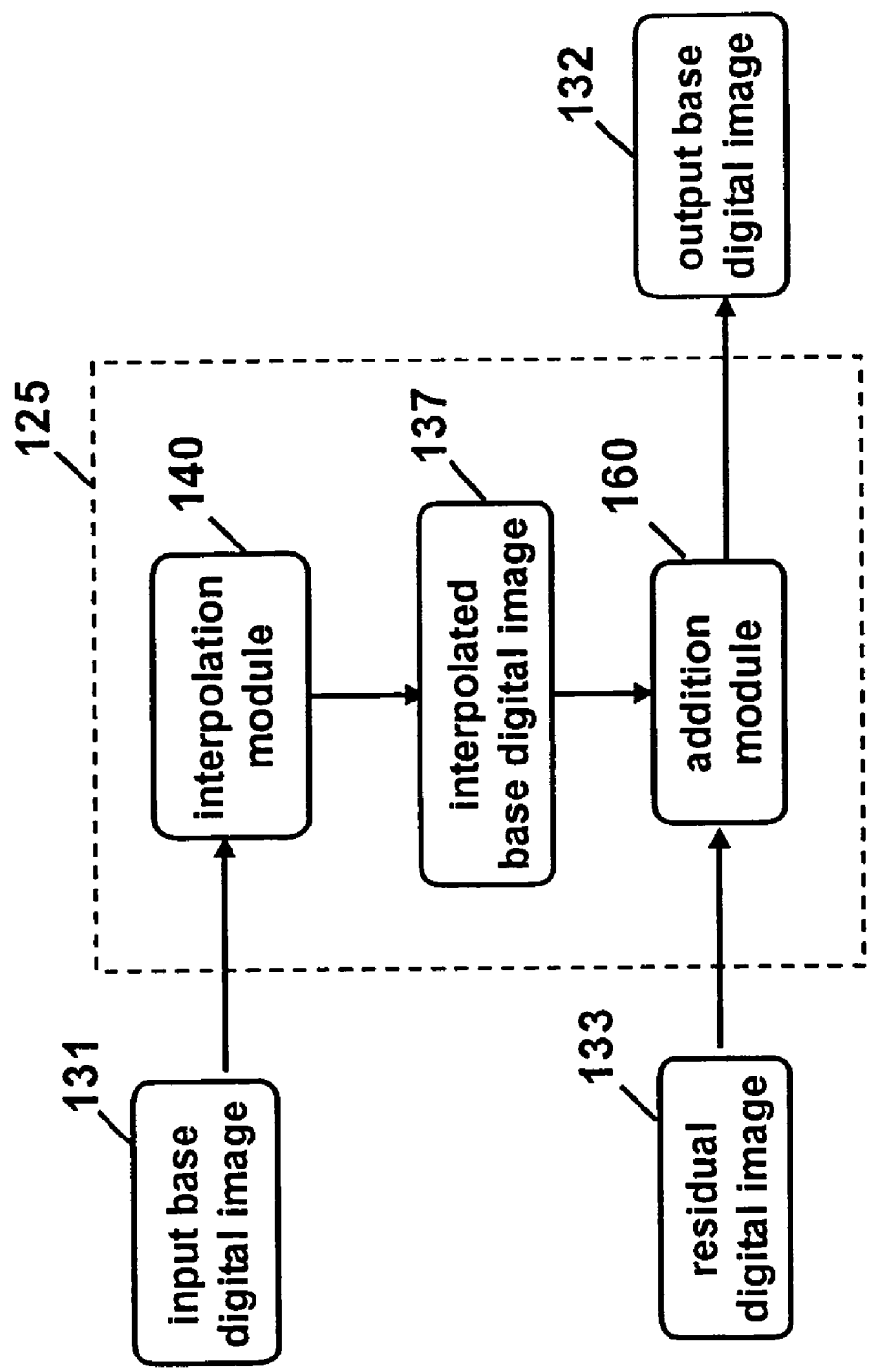
FIG. 13 is a functional block diagram showing in more detail the pyramid level regeneration module for an alternative embodiment.

An alternative embodiment of the pyramid level regeneration module 125 is shown in FIG. 13. The input base digital image 131 is received by the interpolation module 140 and generates the interpolated base digital image 137. The addition module 160 receives the residual digital image 133 and adds it to the interpolated base digital image 137 to generate the output base digital image 132.

It should also be noted that if the pyramid level generation module 115 shown in FIG. 6 is used in conjunction with the pyramid level regeneration module 125 shown in FIG. 13, the reconstructed digital image formed, i.e. the pedestal digital image 111 is identical to the input digital image, i.e. the luminance digital image 107. Therefore, it will be appreciated that the image pyramid representation of the luminance digital image 107 can be used to reconstruct the luminance digital image 107 and can be used to reconstruct the original digital image 101 if no texture and noise removal processing is performed on the components of the image pyramid representation 108.

It is also possible to employ the texture removal processing during the pyramid construction phase of the processing in a manner that operates on the residual digital images as opposed to the base digital images. In a further alternative embodiment, the luminance digital image 107 (of FIG. 2a) is used as the input base digital image 131 to the pyramid level generation module 115 shown in FIG. 14a. The modules 140, 150, 180, 260, and 270 perform the same functions as described above. The input base digital image 131 is received and processed by the base filter module 180 to produce an output base digital image 132. The output base digital image 132 is received by the interpolation module 140 and generates an interpolated base digital image 137. The difference module 150 receives the interpolated base digital image 137 and the input base digital image 131 and generates a temporary residual digital image 153.

Figure 14A:
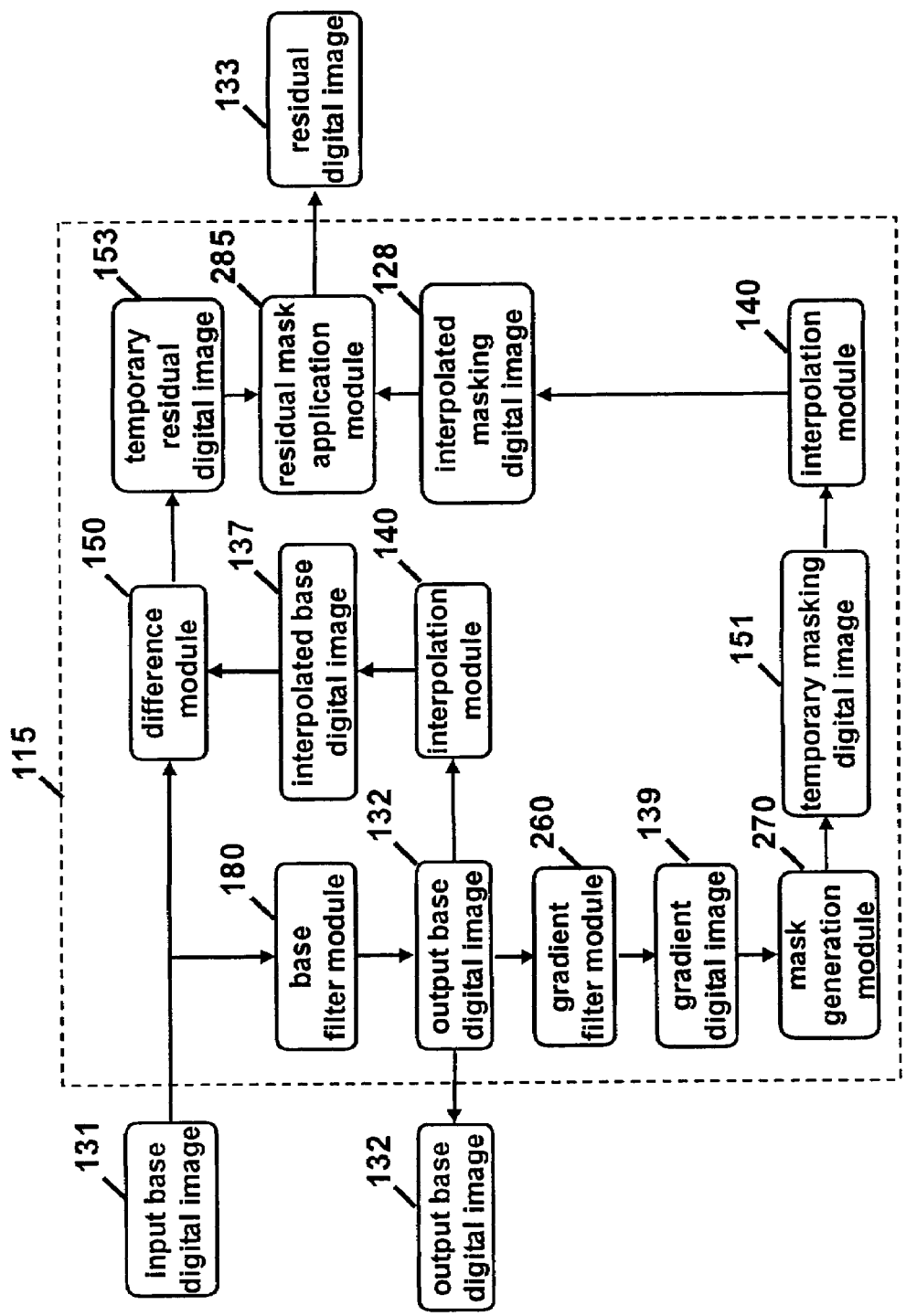
FIG. 14a is a functional block diagram showing in more detail the pyramid level generation module of FIG. 8a for another alternative embodiment.

In an alternative embodiment, the masking digital image is derived from the lower spatial resolution base digital image and then interpolated to the spatial resolution of the residual digital image. The masking digital image is used to modify the residual digital image directly. Referring to FIG. 14a, the output base digital image 132 is also received by the gradient filter module 260 which generates a gradient digital image 139. The gradient digital image 139 is received by the mask generation module 270 and generates a temporary masking digital image 151. The interpolation module 140 receives the temporary masking digital image 151 and generates an interpolated masking digital image 128. The residual mask application module 285 receives the temporary residual digital image 153 and applies the interpolated masking digital image 128 to the temporary residual digital image 153 to form the residual digital image 133. The operation of the residual mask application module 285 is performed using the formula given by (10)

$$PR_{ij} = \mu_{ij} TR_{ij} \qquad (10)$$

where the term $PR_{ij}$ represents the pixel values of the residual digital image 133, the term $\mu_{ij}$ represents the pixel values of the output masking digital image 135 as a control signal, and $TR_{ij}$ represents the pixel values of the temporary residual digital image 153.

Both the alternative embodiments of the pyramid level generation module 115 shown in FIG. 12 and FIG. 14a can be used in conjunction with the pyramid level regeneration module 125 shown in FIG. 8a and FIG. 8b. When used in this configuration, texture and noise removal processing is performed in both the pyramid construction processing and the pyramid reconstruction processing. It is also possible the use either pyramid level generation module 115 shown in FIG. 12 or FIG. 14a in conjunction with the pyramid level regeneration module 125 shown in FIG. 13 which does not include texture and noise removal processing.

Figure 14B:
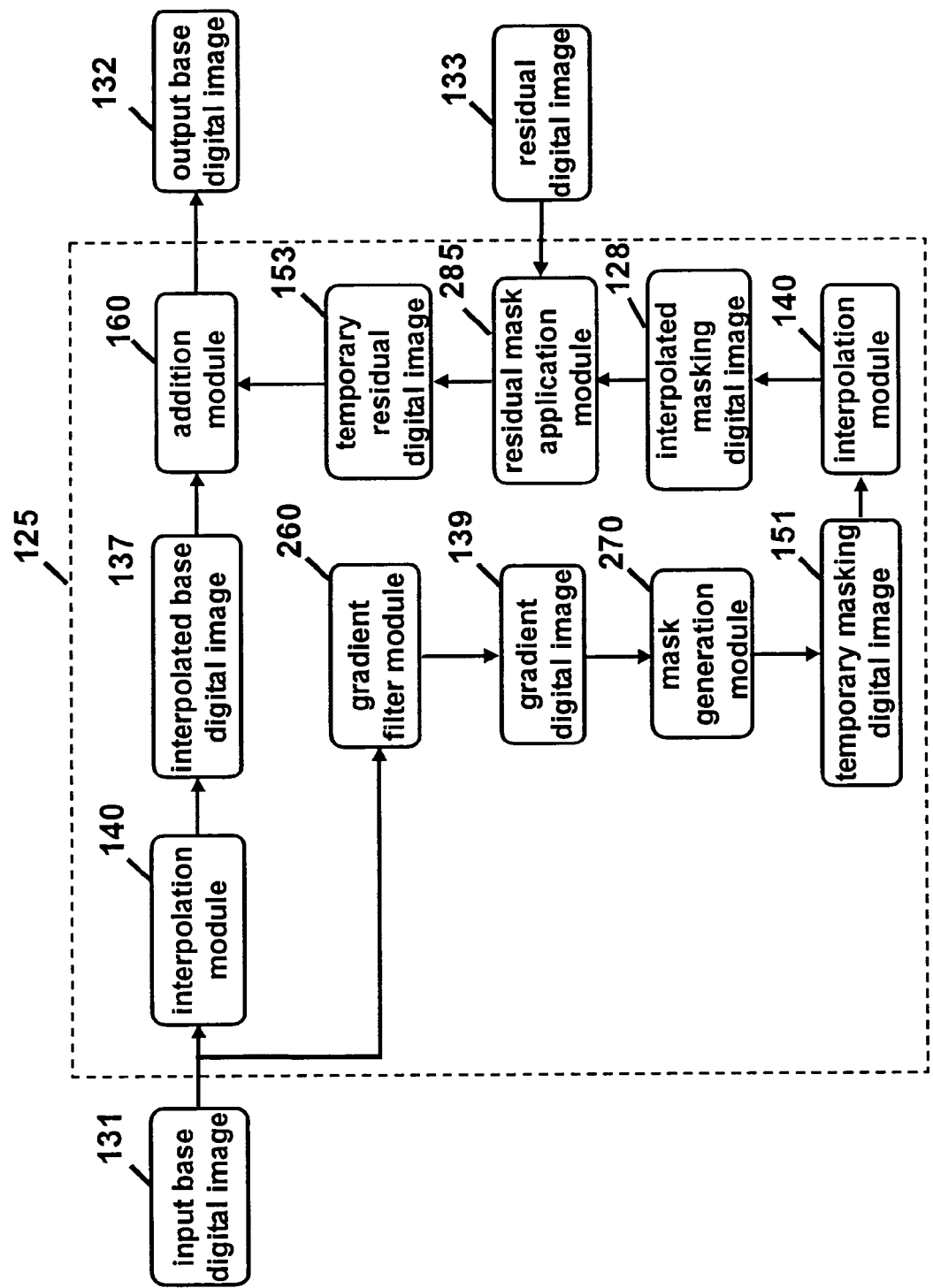
FIG. 14b is a functional block diagram showing in more detail the pyramid level regeneration module of FIG. 8a for another alternative embodiment.

It is also possible to employ the texture removal processing during the pyramid reconstruction phase of the processing in a manner that operates on the residual digital images as opposed to the base digital images. In a further alternative embodiment, the luminance digital image 107 of FIG. 2a is used as the input base digital image 131 to the pyramid level generation module 125 shown in FIG. 14b. The input base digital image 131 is received by the interpolation module 140 which generates the interpolated base digital image 137. The addition module 160 receives both the interpolated base digital image 137 and the temporary residual digital image 153 and generates the output base digital image 132.

The gradient filter module 260 receives the input base digital image 131 and generates the gradient digital image 139. The mask generation module 270 receives the gradient digital image 139 and generates temporary masking digital image 151. The interpolation module 140 receives the temporary masking digital image 151 and generates an interpolated masking digital image 128. The residual mask application module 285 receives the interpolated masking digital image 128 and the residual digital image 133 and generates the temporary residual digital image 153.

An important aspect of the present invention is the application of a texture reducing spatial filter to one or more of the base digital images of an image pyramid representation. It should be noted that while each residual digital image of an image pyramid representation does relate to a different pass-band of spatial frequency content, not all of the spatial frequency content of a given pass-band of spatial frequencies is contained within any single residual digital image. In particular, some of the spatial frequency content of a given pass-band of spatial frequencies is contained in the corresponding spatial resolution base digital image. Since the spatial frequency content of a given pass-band of spatial frequencies is distributed rather than isolated, removing texture and noise from a base digital image may have a similar effect on the resultant processed digital image as removing texture and noise from the corresponding residual digital image. However, the spatial frequency content of a given pass-band of spatial frequencies contained in a base digital image is not identical to the spatial frequency content of the same pass-band of spatial frequencies contained in the corresponding residual digital image. Therefore, removing texture and noise from a base digital image does not have the identical effect of removing texture and noise from the corresponding residual digital image.

Figure 15:
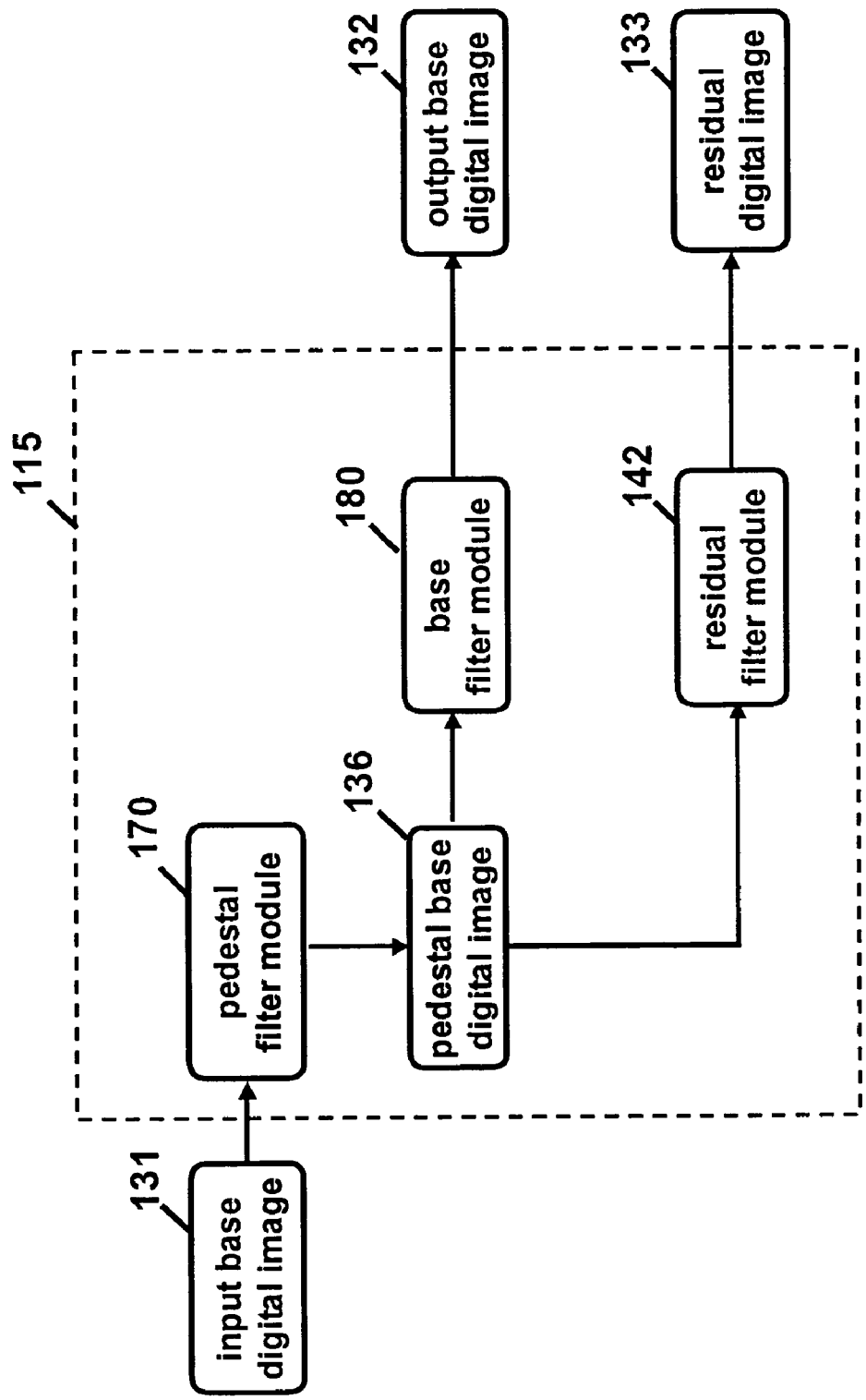
FIG. 15 is a functional block diagram showing in more detail the pyramid level generation module of FIG. 4 for an alternative embodiment utilizing wavelet filters.

An important feature of the present invention is the ability to use a variety of different image pyramid representations. An alternative embodiment of the present invention uses an image pyramid representation based on the wavelet transform as described by Adelson et al. in U.S. Pat. No. 5,526,446 issued Jun. 11, 1996. Those skilled in the art will recognize that any JPEG 2000 (Joint Photographic Experts Group) wavelet transform can also be used. FIG. 15 shows the details of the pyramid level generation module 115 for this alternative embodiment. The pedestal filter module 170 receives and processes the input base digital image 131 resulting in a pedestal base digital image 136. The pedestal base digital image 136 is received by the base filter module 180 which generates an output base digital image 132 containing the low frequency wavelet coefficients produced by the application of spatial sampling and wavelet spatial filters. The pedestal base digital image 136 is also received by the residual filter module 142 which produces a residual digital image 133 containing the high frequency wavelet coefficients produced by spatial sampling and other wavelet spatial filters. The wavelet transform is accomplished through the application of wavelet filters, i.e. specialized spatial filters applied to image pixel data. The residual digital image 133 actually contains three high frequency wavelet coefficient elements, one corresponding to the horizontally filtered image, one corresponding to the vertically filtered image, and one corresponding to the vertically and horizontally filtered image. Each high frequency wavelet coefficient element is a digital image having half the linear spatial resolution as the input base digital image 131.

Figure 16:
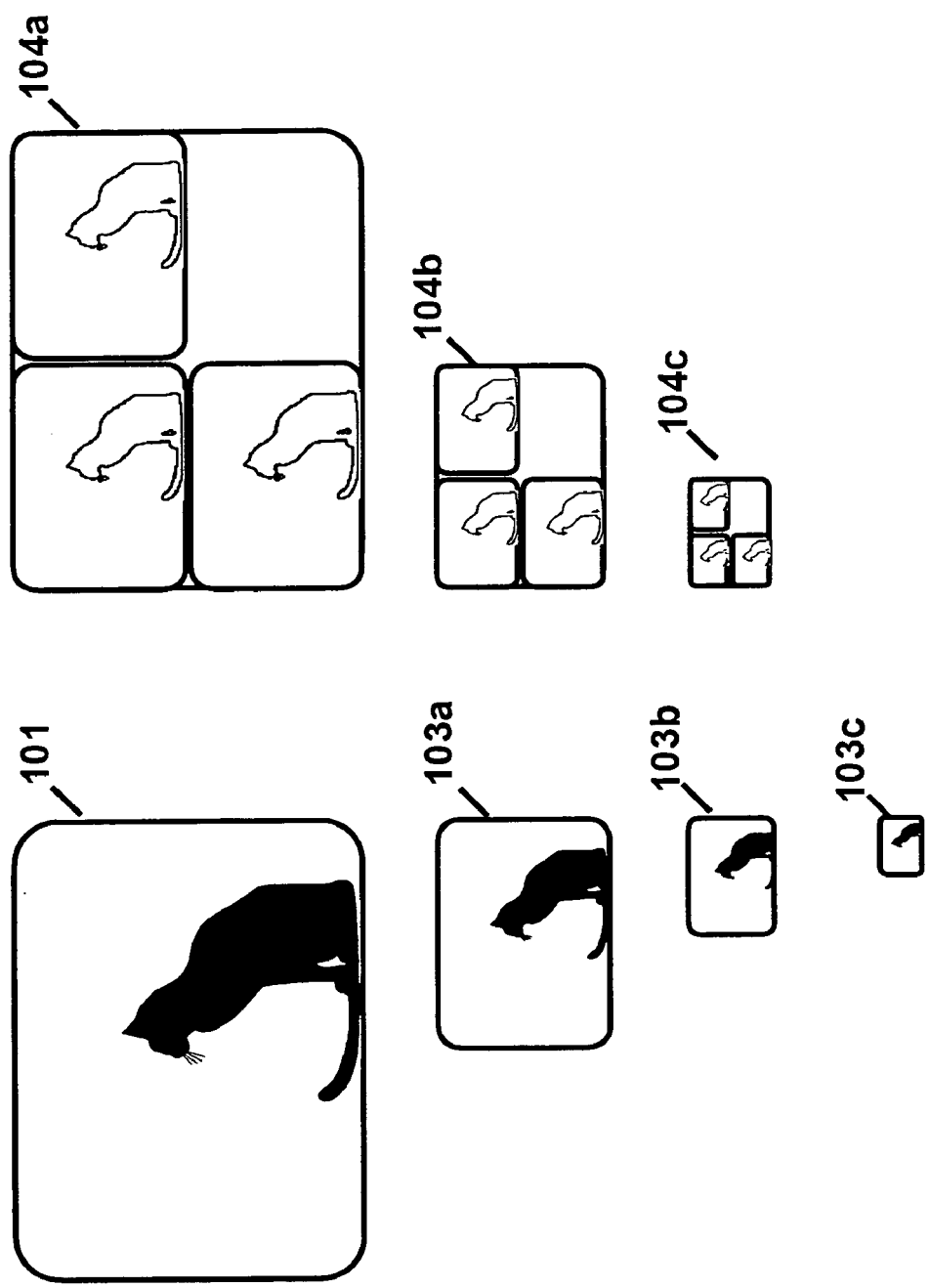
FIG. 16 is a diagram showing the relative sizes of the original digital image, the residual digital images, and the base digital images in accordance with the present invention for the alternative embodiment utilizing wavelet filters.

On the first application of the pyramid level generation module 115, the original digital image 101 is used as the starting input base digital image. On the second application of the pyramid level generation module 115, the output base digital image from the previous application is substituted for the input base digital image 131 and processed in similar manner. The preferred embodiment of the present invention uses a six level image pyramid representation. Therefore, after multiple applications of the pyramid level generation module 115 an image pyramid representation 108 is generated which includes a plurality of base digital images and a plurality of residual digital images. The base digital images and residual digital images produced with this wavelet based alternative embodiment are shown pictorially in FIG. 16.

Figure 17:
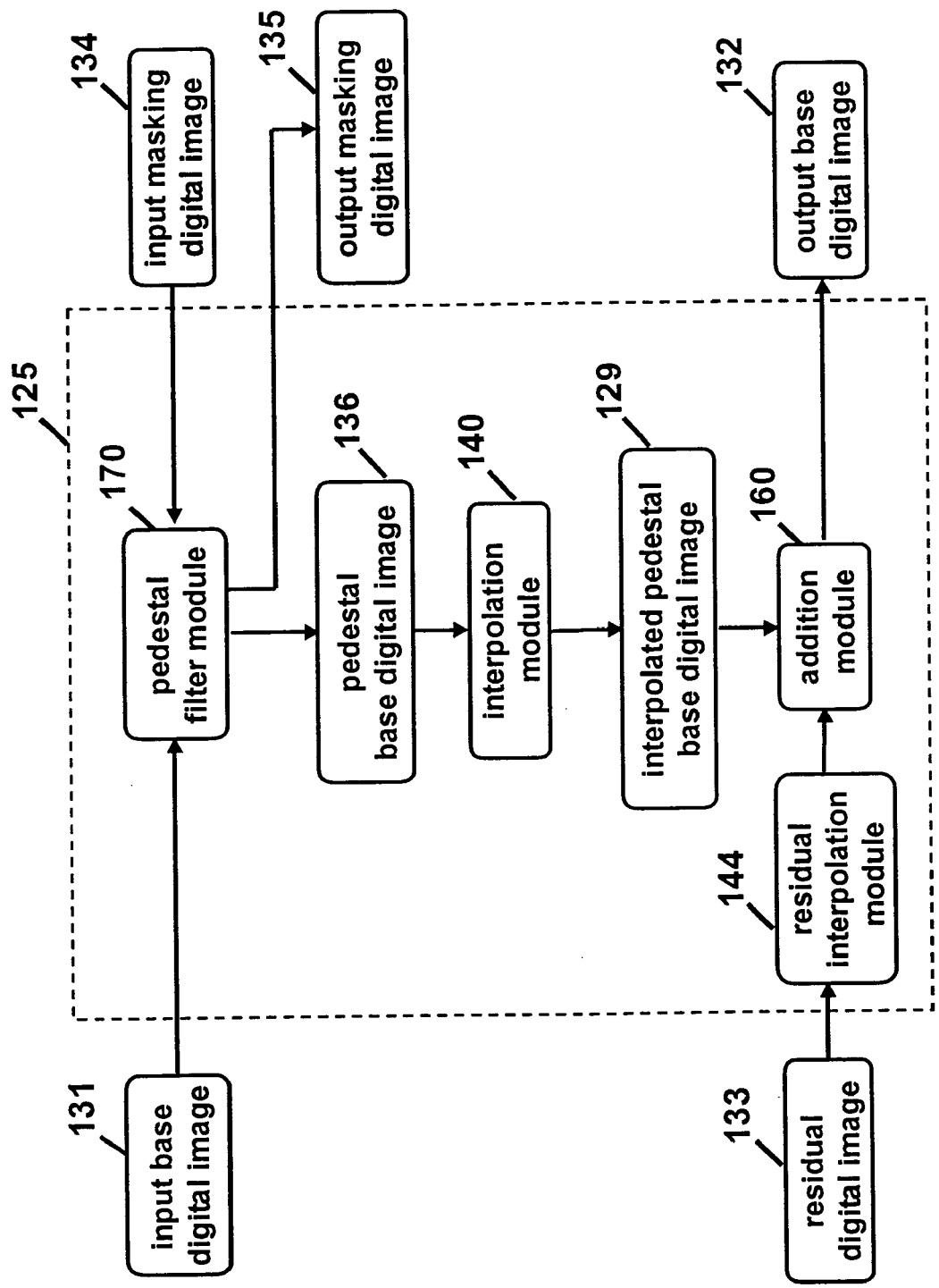
FIG. 17 is a functional block diagram showing in more detail the pyramid level regeneration module for an alternative embodiment utilizing wavelet filters.

The details of the pyramid level regeneration module 125 used for this wavelet based alternative embodiment are shown in FIG. 17. The pedestal filter module 170 receives and processes the input base digital image 131 to produce a pedestal base digital image 136. The pedestal filter module 170 removes texture and noise from the input base digital image 131 with the application of a pedestal filter, or texture reducing spatial filter, which also uses the input masking digital image 134. The input masking digital image 134 is used to identify edge regions and textured regions within the input base digital image 131. The interpolation module 140 receives the pedestal base digital image 136 which generates the interpolated pedestal base digital image 129 containing the low frequency wavelet coefficients produced by the application of a wavelet interpolation. Also produced by the pedestal filter module 170 is the output masking digital image 135. The residual interpolation module 144 receives the residual digital image 133 containing the high frequency wavelet coefficients and generates an interpolated residual digital image by the application of other wavelet interpolation spatial filters. The interpolated residual digital image contains three high frequency wavelet coefficient elements, one corresponding to the horizontally filtered image, one corresponding to the vertically filtered image, and one corresponding to the vertically and horizontally filtered image. The addition module 160 receives the interpolated residual digital image and the interpolated base digital image 129 and generates an output base digital image 132. The addition module 160 numerically adds the corresponding pixels of the four wavelet coefficients included in the interpolated base digital image 129 and the interpolated residual digital image.

The LCC module 210 shown in FIG. 2a employs a 3 element by 3 element matrix transformation to convert the red, green, and blue pixel values of the original digital image 101 into luminance and chrominance pixel values. Let $R_{ij}$, $G_{ij}$, and $B_{ij}$ refer to the pixel values corresponding to the red, green, and blue digital image channels located at the $i^{th}$ row and $j^{th}$ column. Let $L_{ij}$, $G_{ij}$, and $ILL_{ij}$ refer to the transformed luminance, first chrominance, and second chrominance pixel values respectively of an LCC original digital image. The 3 element by 3 elements of the matrix transformation are described by (11).

$$L_{ij}=0.333\ R_{ij}+0.333\ G_{ij}+0.333\ B_{ij} \quad (11)$$

$$GM_{ij}=-0.25\ R_{ij}+0.50\ G_{ij}-0.25\ B_{ij}$$

$$ILL_{ij}=-0.50\ R_{ij}+0.50\ B_{ij}$$

Those skilled in the art will recognize that the exact values used for coefficients in the luminance/chrominance matrix transformation may be altered and still yield substantially the same effect. An alternative also used in the art is described by (12).

$$L_{ij}=0.375\ R_{ij}+0.500\ G_{ij}+0.125\ B_{ij} \quad (12)$$

$$GM_{ij}=-0.250\ R_{ij}+0.500\ G_{ij}-0.250\ B_{ij}$$

$$ILL_{ij}=-0.500\ R_{ij}+0.50\ B_{ij}$$

The RGB module 220 shown in FIG. 2a employs a 3 element by 3 element matrix transformation to convert the luminance and chrominance pixel values into red, green, and blue pixel values by performing the inverse matrix operation to the LCC module 210. The matrix elements of the RGB module are given by (13).

$$R_{ij}=L_{ij}-0.666\ GM_{ij}-ILL_{ij} \quad (13)$$

$$G_{ij}=L_{ij}+1.333\ GM_{ij}$$

$$B_{ij}=L_{ij}-0.666\ GM_{ij}+ILL_{ij}$$

The present invention can be employed with any number of pyramid levels. Noise in images is generally a function of spatial resolution and is also more objectionable for the higher spatial resolution pyramid levels. The optimal number of pyramid levels depends on the texture removal goals of the digital imaging system designer and on the size of the digital images being processed. The preferred embodiment of the present invention uses six pyramid levels for effective texture and noise removal for digital images of size 1024 by 1536 pixels. For processing digital images of greater spatial resolution, such as 2048 by 3072 pixel, seven pyramid levels are used. For processing digital images of lower spatial resolution, such as 512 by 768 pixels, 5 pyramid levels are used.

The present invention can be practiced with a variety of methods that generate scene dependent tone scale functions, i.e. tone scale functions derived from the digital image pixel data for which the tone scale function is to be applied. The tone scale generator 230 (shown in FIG. 2) incorporates a combination of the methods disclosed in U.S. Pat. Nos. 4,731,671 issued Mar. 15, 1988 l to Alkofer, and 5,822,453 issued Oct. 13, 1998 to Lee et al., to calculate the tone scale function 203. These methods are employed to produce two individual tone scale functions. These individual tone scale functions are then cascaded into a single tone scale function 203 which is used to adjust the brightness and contrast of the pedestal digital image 111. The details of the construction of the tone scale function 203 are described below.

A Laplacian spatial filter is applied to the analysis digital image 201 shown in FIG. 2a which results in a Laplacian digital image. A first histogram $H_1(m)$ is calculated from the absolute magnitude of the pixel values (m) from the Laplacian digital image. Next, a threshold value is determined from the first histogram that is used to classify spatially flat regions from spatially active regions of the analysis digital image 201. The threshold value is then used to generate an analysis masking digital image, i.e. a masking value relating to each pixel in the analysis digital image 201. A second histogram $H_2(\ )$ is calculated from the pixels of the analysis digital image 201 that have been classified as spatially active as indicated by the analysis masking digital image. The second histogram $H_2(x)$ spans the numerical range of pixel values (x) and represents the frequency of occurrence of spatially active pixels values in the analysis digital image 201. The functional shape of the second histogram varies based on the image content of the original digital image 101. A Gaussian distribution function G(x) is used to smooth and reshape the second histogram via a convolution operation which results in third histogram $H_3(x)$. The standard deviation of the Gaussian distribution function can be as a control parameter to vary the eventual degree of contrast adjustment imparted to the enhanced digital image 102. A calculated standard deviation value is then derived from the third histogram. A reference standard deviation, which has been predetermined through experimentation, is then divided by the calculated standard deviation value resulting in a resizing factor. The third histogram is then stretched (when the resizing factor is greater than 1.0) or compressed (when the resizing factor is less than 1.0) with respect to the variable x to produce a fourth histogram $H_4(x)$ such that $H_4(x)=H_3(\alpha(x-x_o))$ and $x_o$ represents a reference gray pixel value $(x_r)$ that remains constant through the transformation. That is, $T_1(x_r)=x_r$. The tone scale function $T_1(x)$ is calculated by comparing the cumulative histogram distribution functions $C_2(x)$ and $C_4(x)$ derived from $H_2(x)$ and $H_4(x)$ respectively. Therefore, $T_1(x)=C_4^{-1}(C_2(x))$ where $C_4^{-1}(\ )$ represent the inverse function of $C_4(x)$.

The first tone scale function $T_1(x)$, when used to produce the enhanced digital image 102 achieves a contrast enhancement by reshaping the histogram of pixel values. As such the first tone scale function can be used as the tone scale function 203. As a further refinement, a second tone scale function $T_2(x)$ is calculated and combined with $T_1(x)$ to generate a third tone scale function $T_3(x)$. The second tone scale function is designed to map the pixel values of the pedestal digital image 111 to a numerical range relating to photographic print densities. A fifth histogram $H_5(x)$ is calculated by the equation $H_5(x)=T_1(H_2(x))$. Next the 0.5 percent cumulative histogram pixel value $x_b$ is derived from $H_5(x)$. An output pixel value $Y_b$ corresponding to a photographic paper maximum density is experimentally determined. A linear function is used for $T_2(x)$ for pixel values (x) less than or equal to $x_r$ such that $T_2(x_b)=Y_b$ and $T_2(x_r)=x_r$. Similarly, the 99.5 percent cumulative histogram pixel value $x_w$ is derived from $H_5(x)$. An output pixel value $Y_w$ corresponding to a photographic paper minimum density is experimentally determined. A linear function is used for $T_2(x)$ for pixel values (x) greater than or equal to $x_r$ such that $T_2(x_w)=Y_w$ and $T_2(x_r)=x_r$. The third tone scale function $T_3(x)$ is given as $T_3(x)=T_2(T_1(x))$. For high dynamic range digital images, the tone scale function $T_2(x)$ is responsible for the compressive nature of the combined tone scale function.

It is also possible to use the second tone scale function $T_2(x)$ as the tone scale function 203. As a further refinement a fourth tone scale function $T_4(x)$ is calculated as a modified version of the third tone scale function $T_3(x)$ by applying slope constraints to $T_3(x)$. In particular, the slope of the $T_4(x)$ function is constrained to be within a minimum and maximum slope limit value. The slope constraints are applied separately to the two function domains defined above an below the reference gray value $x_r$. For some calculated tone scale functions the minimum and maximum slope constraints are not exceeded resulting in the $T_4(x)$ function being identical to the function $T_3(x)$. By limiting the slope of the tone scale function 203 image artifacts can be avoided.

The present invention can be use with other methods of generating the tone scale function 203. For example, the method disclosed by Lee in U.S. Pat. No. 6,285,798, referenced above, can be used and results in tone scale functions that have some the same properties as the tone scale functions generated with the method described above. The method disclosed by Lee includes calculating a tone scale function that maps the extremes of a cumulative histogram to output pixel values that correspond to the photographic paper minimum and maximum densities while maintaining a reference gray pixel value.

The present invention can also be used with tone scale functions that are not derived from the pixels values of the original digital image 101, i.e. scene independent tone scale functions. For example, a linear tone scale function constructed as $T_5(x)=0.6\ (x-x_r)+x_r$ has been implemented and used as the tone scale function 203 yielding excellent image enhancement results. This tone scale function achieves a dynamic range compression effect due the linear equation having a slope of less than 1.0.

The possible use of the present invention can be detected in another digital imaging system through the use of specialized test imagery and subsequent analysis of the processed test imagery. Test digital images are prepared by selecting digital images that are typically improved by the present invention from a data base of digital images. The test digital images $\{t_1, t_2, \ldots, t_n\}$ are then transmitted to the system in question, processed by the system in question, and the service digital images $\{q_1, q_2, \ldots, q_n\}$ are received for analysis. The test digital images $\{t_1, t_2, \ldots, t_n\}$ are also processed using an implementation of the present invention, resulting in processed digital images $\{p_1, p_2, \ldots, p_n\}$, on a digital imaging system that is under complete control with regard to the image processing control parameters associated with the present invention. The processed digital images and the service digital images are compared on an image by image basis to produce an error metric $\{e_1, e_2, \ldots, e_n\}$, one error metric value corresponding to each digital image. The error metric values are then used to determine the likelihood that the present invention was employed by the system in question to generate the service digital images.

The present invention can be used with a variety of different tone scale functions. Therefore, it is possible that the present invention can be used by the system in question with a different tone scale function generation method than disclosed herein. Therefore, the first part of the detection analysis involves deriving the tone scale function that was used by the system in question individually for each test digital image. This is necessary due to the fact that the tone scale function can be dependent on the test digital image and can therefore be unique for a given test digital image. Deriving a tone scale function is accomplished by an analysis technique that compares, on a pixel by pixel basis, the functional relationship between the pixels of a service digital image $q_j$ and a test digital image $p_j$. If there is a one-to-one relationship between the pixels being compared, i.e. the test digital image pixels can be used to exactly predict the pixels of the service digital image, then it is unlikely that the present invention was employed to generate that service digital image $q_j$. The approximate tone scale function $T_j(x)$ can be calculated by using the following procedure. For each function value of $T_j(x_k)$, the pixel values in $q_j$ that correspond to a pixels in $p_j$ that have a narrow range of values between $x_k-\delta$ and $x_k+\delta$ are averaged. This establishes the average functional relationship between pixels in the two compared digital images. This process is repeated for all domain of pixel values and thus establishes $T_j(x)$. This process is repeated for the other test digital images.

Once the approximate tone scale functions are calculated they can be used to generate the processed digital images. Each processed digital image $p_j$ is then compared to its corresponding service digital image $q_j$ on a pixel by pixel basis. A variety of different metrics can be used to indicate the similarity between the digital images $q_j$ and $p_j$. Let $p_{ji}$ represent the $i^{th}$ pixel of the $j^{th}$ processed digital image and $q_{ji}$ represent the corresponding $i^{th}$ pixel of the $j^{th}$ service digital image. A pixel deviation value $d_{ji}$ is calculated by subtracting the $p_{ji}$ values from the $q_{ji}$ values. The pixel deviation values $d_{ji}$ are then used to calculate the error metric $e_j$ for the $j^{th}$ test image. If the present invention was used to generate the $j^{th}$ service digital image $q_j$, the magnitude of the pixel deviation values $d_{ji}$ will be correlated and usually will be small. The error metric $e_j$ can be calculated as a combination of the statistical correlation of the $d_{ji}$ values and the root-sum-square of the $d_{ji}$ values. The statistical correlation factor is an indication of how similar the pixel deviation values are. Therefore, if the statistical correlation factor for the $j^{th}$ test image is high, it is an indication of a high likelihood that the present invention was employed by the system in question independent of the root-sum-square factor since the pixel deviations could then be explained by some unaccounted for systematic algorithm also employed by the system in question. If the magnitude of the root-sum-square factor is low, in particular is on the order of the pixel noise magnitude, it is an indication of a high likelihood that the present invention was employed since the inherent pixel fluctuations due to noise can explain a low statistical correlation factor. Small magnitude root-sum-square factors also indicate that the method employed by the system must at least be mathematically very similar to that of the present invention. If the statistical correlation factor for the $j^{th}$ test image is low, it is an indication of either a low likelihood that the present invention was employed by the system in question or that there is some other algorithm employed by the system in question that has the effect of randomizing the pixel deviation values. The above described analysis can be embodied into the single error metric $e_j$ by combining the statistical correction factor and root-sum-squared factor with an empirically derived function.

The above described analysis is performed on each test digital image to produce approximate tone scale functions and must be analyzed to reject test digital images that do not undergo significant tone scale enhancement. This is necessary due to the fact that mild tone scale functions can result in small root-sum-squared factors and high statistical correlation factors. Thus only test digital images that have a corresponding approximate tone scale function of dramatic effect are used in the analysis to determine the likelihood of the present invention having been employed in the system in question. Another method of rejecting test digital images from the analysis is to visualize the before and after processing images on a display device and reject those test digital images that show only mild tone scale changes. An overall likelihood of use of the present invention having been employed by the system in question can be calculated from the individual error metric values. For example, the average error metric value or the average of the largest 25 percent error metric values can be used as an indication of overall likelihood.

There can be other systematic processes employed by the system in question that can influence the magnitude and correlation properties of the of the pixel deviation values $d_{ji}$. For example, color matrix algorithms can significantly alter the pixel deviation value correlation property. However, the effect of a color matrix can be minimized by analyzing other test digital images that include flat patch targets representing a variety of different unique colors. For this analysis a color patch digital image is processed by the system in question. The functional relationship between the input pixel values and the output pixel values can be derived by determining the best fit 3 by 3 color matrix that minimizes the root mean squared error. The calculated approximate color matrix can then be used to modify the implementation of the present invention to account for the statistical deviations induced by a color matrix transform. It is also possible to use test digital images that include a small set of color patches and derive a color matrix that is unique to the test digital image. This procedure can account for a system in question that employs an image dependent color matrix.

Other image processing algorithms, such as spatial sharpening or noise reduction algorithms can also affect the properties of the pixel deviation values. The use of a noise reduction method having been employed by the system in question can be determined through the use of the color patch digital image described above. The before and after processed digital images can be analyzed within the flat patch regions to determine the change in magnitude of the stochastic pixel fluctuations. If the use of a noise reduction method is detected, a variety of noise reduction methods can be employed by the system implementing the present invention to produce a similar reduction in noise magnitude. In general, the use of a noise reduction method in the system in question will, in general, tend to produce analysis results that could falsely indicate that the present invention was not employed by the system in question. It is highly unlikely that the use of a noise reduction method in the system in question alone can produce analysis results that falsely indicate the present invention was employed by the system in question.

Spatial sharpening algorithms are employed by many digital imaging systems and can change the statistical properties of the pixel deviation values. However, the goal of spatial sharpening algorithms is the amplification of image signal content. An important aspect of the present invention is the preservation of image signal content while enhancing the tone scale contrast of a digital image. Thus, both the amplification and preservation of the image signal content will tend to have similar effects on pixel data. Therefore, the magnitude of the pixel deviation values may increase with the use of a spatial sharpening algorithm in the system in question, however, the statistical correlation factor should be relatively unaffected. It should also be noted that it is unlikely that the use of a spatial sharpening algorithm alone can result in a high statistical correlation factor since only test digital images with associated dramatic tone scale functions have been selected for analysis.

It is also possible for the system in question to employ the present invention and not have a high likelihood of use indicated by the above described analysis procedure. Most systems can be operated in a variety of different modes by turning on and off different combinations of features. This can complicate the detection method. The above test can be repeated by configuring the system in question in as many modes as is practical and possible. The results can be analyzed to find if any of the configurations yield a high likelihood of use with the above described test procedure.

Similarly, the system in question may have employed the present invention but may have used different control parameter setting for the implementation. Therefore the above described tests may need to be repeated using different combinations of the parameter values described above that can affect the imaging results such as but not limited to: the number of pyramid levels, the shape of the edge preserving function, and the sigma filter threshold value.

Some digital imaging systems do not allow for an option of receiving service digital images (processed digital images) and only provide for the generation of service photographic prints. For such systems in question, it is possible to scan the service photographic prints with a high quality print scanner which allows does generate digital images. Thus service digital images can be produced from the service photographic prints. It may be necessary to develop a scene independent tone scale function to process the scanned digital images from the print scanner to get them into a form suitable for analysis. This can be accomplished with the procedure described above using test prints that include gray scale test patches.

The invention has been described in detail with particular reference to certain preferred embodiments thereof, but it will be understood that variations and modifications can be effected within the spirit and scope of the invention.

PARTS LIST

- 10 image capture device
- 20 digital image processor
- 30 image output device
- 40 general control computer
- 50 display device
- 60 input control device
- 70 offline memory device
- 100 pedestal generation module
- 101 original digital image
- 102 enhanced digital image
- 103a base digital image
- 103b base digital image
- 103c base digital image
- 104a residual digital image
- 104b residual digital image
- 104c residual digital image
- 105a texture reduced base digital image
- 105b texture reduced base digital image
- 105c texture reduced base digital image
- 106a masking digital image
- 106b masking base digital image
- 106c masking base digital image
- 107 luminance digital image
- 108 image pyramid representation
- 109 chrominance digital image
- 110 pyramid construction module
- 111 pedestal digital image
- 112 texture digital image
- 113 enhanced luminance digital image
- 115 pyramid level generation module
- 120 pyramid reconstruction module
- 125 pyramid level regeneration module
- 128 interpolated masking digital image
- 129 interpolated pedestal base digital image
- 131 input base digital image
- 132 output base digital image
- 133 residual digital image
- 134 input masking digital image
- 135 output masking digital image
- 136 pedestal base digital image
- 137 interpolated base digital image
- 138 low-pass base digital image
- 139 gradient digital image
- 140 interpolation module
- 142 residual filter module
- 144 residual interpolation module
- 149 edge preservation function
- 150 difference module
- 151 temporary masking digital image
- 153 temporary residual digital image
- 160 addition module
- 170 pedestal filter module
- 180 base filter module
- 201 analysis digital image
- 203 tone scale function
- 205 tone scale adjusted digital image
- 210 LCC conversion module
- 220 RGB conversion module
- 230 tone scale function generator
- 240 tone scale function applicator
- 250 low-pass filter module
- 260 gradient filter module
- 270 mask generation module
- 280 mask application module
- 285 residual mask application module
- 301 pixel of interest
- 302 pixel location
- 303 pixel location

What is claimed is:

1. A method of processing a digital image to improve tone scale, comprising the steps of:
   a) generating a multiresolution image representation of an original digital image including a plurality of base digital images and a plurality of residual digital images wherein:
      i) the base digital images are each of a different spatial resolution and are lower spatial resolution versions of the original digital image;
      ii) the residual digital images have different spatial resolution and include spatial detail relating to a different pass-band of spatial frequencies;
   b) applying a texture reducing spatial filter to the base digital images to produce texture reduced base digital images; and
   c) combining the texture reduced base digital images and the residual digital images to generate a texture reduced digital image;
   d) subtracting the texture reduced digital image from the digital image to produce a texture digital image;
   e) applying a compressive tone scale function to the texture reduced digital image to produce a tone scale adjusted digital image having a compressed tone scale in at least a portion of the image; and
   f) combining the texture digital image with the tone scale adjusted digital image to produce an enhanced digital image, whereby the contrast of the enhanced digital image is improved without compressing the contrast of the texture in the original digital image.

2. The method of claim 1, wherein the step f) of combining includes the steps of scaling the texture digital image by a constant and adding the scaled texture digital image to the tone scale adjusted digital image.

3. The method of claim 1, wherein the base digital images are generated using a two-dimensional Gaussian filter.

4. The method of claim 1, wherein the base digital images are generated using a two orthogonal one-dimensional Gaussian filters.

5. The method of claim 1, wherein the residual digital images are generated using a bi-linear interpolation filter.

6. The method of claim 1, wherein the residual digital images are generated using a bi-cubic interpolation filter.

7. The method of claim 1, wherein the base digital images are generated using two orthogonal one-dimensional Gaussian filters and the residual digital images are generated by applying a bi-linear interpolation filter to a base digital image to generate an interpolated digital image and subtracting the interpolated digital image from a next higher resolution base digital image.

8. The method of claim 1, wherein wavelet filters are used to generate the multiresolution digital image representation of the original digital image.

9. The method of claim 1, wherein the original digital image is a color digital image having a plurality of color channels and the tone scale function is applied to all of the color channels.

10. The method of claim 1, wherein the original digital image is a color digital image having a luminance channel and a plurality of chrominance channels and the tone scale function is applied to the luminance channel.

11. The method of claim 1, wherein the original digital image is a color digital image having a plurality of color channels and the tone scale function includes a component for each of the color channels.

12. The method of claim 1, wherein the spatial filter is a sigma filter.

13. The method of claim 12, wherein the original digital image is composed of pixels and the sigma filter comprises the steps of:
identifying a pixel of interest and a local neighborhood of pixels located about the pixel of interest from the digital image to be filtered;
calculating a difference pixel value for pixels in the local neighborhood of pixels based on the absolute value difference between the value of the pixel of interest and the individual values of pixels included in the local neighborhood of pixels;
using the absolute difference pixel values to calculate a texture reduced pixel value; and
replacing the value of the pixel of interest with the texture reduced pixel value.

14. The method of claim 13, further including the steps of:
comparing the absolute difference pixel values to a threshold value; and
using only the values of pixels included in the local neighborhood of pixels for which the corresponding absolute difference pixel values are less than the threshold value to calculate the texture reduced pixel value.

15. The method of claim I, wherein the spatial filter is a masking filter.

16. The method of claim 15, wherein the masking filter is an edge detecting masking filter.

17. The method of claim 15, wherein the masking filter employs masking signal images from a plurality of base digital images to generate a texture reduced base digital image.

18. The method of claim 1, wherein the tone scale function is derived from the original digital image.

19. The method of claim 16, wherein the edge detecting masking filter includes the step of calculating gradient pixel values.

20. The method of claim 1, wherein the step of generating the multiresolution image representation includes the steps of:
a1) using two one-dimensional Gaussian filters and the original digital image to generate a first base digital image wherein the one-dimensional Gaussian filters are oriented in orthogonal directions to each another;
a2) using a bi-linear interpolation filter and the first base digital image to generate an interpolated digital image; and
a3) subtracting the interpolated digital image from the original digital image to generate a residual digital image.

21. The method of claim 1, wherein the original digital image is derived from photographic film.

22. The method of claim 1, wherein the original digital image is derived from a digital camera.

23. The method of claim 1, wherein the spatial filter is applied to the base image(s) as they are being generated.

24. The method of claim 1, wherein the spatial filter is applied to the base image(s) as they are being combined.

25. The method of claim 1, further comprising the steps of applying a second texture reducing spatial filter to the residual digital images to produce texture reduced residual images, and using the texture reduced residual images to produce the texture reduced digital image.

26. A computer program product stored on a computer readable medium for performing the method of claim 1.

27. Apparatus for processing a digital image to improve tone scale, comprising:
a) means for generating a multiresolution image representation of an original digital image including a plurality of base digital images and a plurality of residual digital images wherein:
i) the base digital images are each of a different spatial resolution and are lower spatial resolution versions of the original digital image;
ii) the residual digital images have different spatial resolution and include spatial detail relating to a different pass-band of spatial frequencies;
b) means for applying a texture reducing spatial filter to the base digital images to produce texture reduced base digital images; and
c) means for combining the texture reduced base digital images and the residual digital images to generate a texture reduced digital image;
d) means for subtracting the texture reduced digital image from the original digital image to produce a texture digital image;
e) means for applying a compressive tone scale function to the texture reduced digital image to produce a tone scale adjusted digital image having a compressed tone scale in at least a portion of the image; and
f) means for combining the texture digital image with the tone scale adjusted digital image to produce an enhanced digital image, whereby the contrast of the enhanced digital image is improved without compressing the contrast of the texture in the original digital image.

28. A method of processing a digital image to improve tone scale, comprising the steps of:
a) generating a multiresolution image representation of the original digital image including a plurality of base digital images and a plurality of residual digital images wherein:
i) the base digital images are each of a different spatial resolution and are lower spatial resolution versions of the original digital image;
ii) the residual digital images have different spatial resolution and include spatial detail relating to a different pass-band of spatial frequencies;
b) applying a texture reducing spatial filter to the base digital images to produce texture reduced base digital images; and
c) combining the texture reduced base digital images and the residual digital images to generate a texture reduced digital image;
d) subtracting the texture reduced digital image from the original digital image to produce a texture digital image;
e) using the original digital image to generate a tone scale function and applying the tone scale function to the texture reduced digital image to produce a tone scale adjusted digital image; and
f) combining the texture digital image with the tone scale adjusted digital image to produce an enhanced digital image, whereby the contrast of the enhanced digital image is improved without compressing the contrast of the texture in the original digital image.

29. The method of claim 28, wherein the step of combining includes the steps of scaling the texture digital image by a constant and adding the scaled texture digital image to the tone scale adjusted digital image.

30. The method of claim 28, wherein the base digital images are generated using a two-dimensional Gaussian filter.

31. The method of claim 28, wherein the base digital images are generated using a two orthogonal one-dimensional Gaussian filters.

32. The method of claim 28, wherein the residual digital images are generated using a bi-linear interpolation filter.

33. The method of claim 28, wherein the residual digital images are generated using a bi-cubic interpolation filter.

34. The method of claim 28, wherein the base digital images are generated using two orthogonal one-dimensional Gaussian filters and the residual digital images are generated by applying a bi-linear interpolation filter to a base digital image to generate an interpolated digital image and subtracting the interpolated digital image from a next higher resolution base digital image.

35. The method of claim 28, wherein wavelet filters are used to generate the multiresolution digital image representation of the original digital image.

36. The method of claim 28, wherein the original digital image is a color digital image having a plurality of color channels and the tone scale function is applied to all of the color channels.

37. The method of claim 28, wherein the original digital image is a color digital image having a luminance channel and a plurality of chrominance channels and the tone scale function is applied to the luminance channel.

38. The method of claim 28, wherein the original digital image is a color digital image having a plurality of color channels and the tone scale function includes a component for each of the color channels.

39. The method of claim 28, wherein the spatial filter is a sigma filter.

40. The method of claim 39, wherein the original digital image is composed of pixels and the sigma filter comprises the steps of:
   identifying a pixel of interest and a local neighborhood of pixels located about the pixel of interest from the digital image to be filtered;
   calculating a difference pixel value for pixels in the local neighborhood of pixels based on the absolute value difference between the value of the pixel of interest and the individual values of pixels included in the local neighborhood of pixels;
   using the absolute difference pixel values to calculate a texture reduced pixel value; and
   replacing the value of the pixel of interest with the texture reduced pixel value.

41. The method of claim 40, further including the steps of:
   comparing the absolute difference pixel values to a threshold value; and
   using only the values of pixels included in the local neighborhood of pixels for which the corresponding absolute difference pixel values are less than the threshold value to calculate the texture reduced pixel value.

42. The method of claim 28, wherein the spatial filter is a masking filter.

43. The method of claim 42, wherein the masking filter is an edge detecting masking filter.

44. The method of claim 42, wherein the masking filter employs masking signal images from a plurality of base digital images to generate a texture reduced base digital image.

45. The method of claim 28, wherein the tone scale function is a compressive function such that the enhanced digital image has a reduced dynamic range relative to the original digital image.

46. The method of claim 43, wherein the edge detecting masking filter includes the step of calculating gradient pixel values.

47. The method of claim 28, wherein the step of generating the multiresolution image representation includes the steps of:
   a1) using two one-dimensional Gaussian filters and the original digital image to generate a first base digital image wherein the one-dimensional Gaussian filters are oriented in orthogonal directions to each another;
   a2) using a bi-linear interpolation filter and the first base digital image to generate an interpolated digital image; and
   a3) subtracting the interpolated digital image from the original digital image to generate a residual digital image.

48. The method of claim 28, wherein the original digital image is derived from photographic film.

49. The method of claim 28, wherein the original digital image is derived from a digital camera.

50. The method of claim 28, wherein the spatial filter is applied to the base image(s) as they are being generated.

51. The method of claim 28, wherein the spatial filter is applied to the base image(s) as they are being combined.

52. The method of claim 28, further comprising the steps of applying a second texture reducing spatial filter to the residual digital images to produce texture reduced residual images, and using the texture reduced residual images to produce the texture reduced digital image.

53. A computer program product stored on a computer readable medium for performing the method of claim 28.

54. Apparatus for processing a digital image to improve tone scale, comprising:
   a) means for generating a multiresolution image representation of an original digital image including a plurality of base digital images and a plurality of residual digital images wherein:
      i) the base digital images are each of a different spatial resolution and are lower spatial resolution versions of the original digital image;
      ii) the residual digital images have different spatial resolution and include spatial detail relating to a different pass-band of spatial frequencies;
   b) means for applying a texture reducing spatial filter to the base digital images to produce texture reduced base digital images; and
   c) means for combining the texture reduced base digital images and the residual digital images to generate a texture reduced digital image;
   d) means for subtracting the texture reduced digital image from the original digital image to produce a texture digital image;
   e) means for generating the tone scale function using the original digital image and means for applying the tone scale function to the texture reduced digital image to produce a tone scale adjusted digital image; and
   f) means for combining the texture digital image with the tone scale adjusted digital image to produce an enhanced digital image, whereby the contrast of the enhanced digital image is improved without compressing the contrast of the texture in the original digital image.

* * * * *

UNITED STATES PATENT AND TRADEMARK OFFICE
CERTIFICATE OF CORRECTION

PATENT NO. : 7,181,086 B2
APPLICATION NO. : 10/163401
DATED : February 20, 2007
INVENTOR(S) : Edward B. Gindele et al.

It is certified that error appears in the above-identified patent and that said Letters Patent is hereby corrected as shown below:

Title Pg, Item (57), Abstract, line 8.   After "images" delete "s".

Column 29, line 1 of claim 15.   After "claim" delete "I," and insert --1,--

Signed and Sealed this

Eighteenth Day of September, 2007

JON W. DUDAS
*Director of the United States Patent and Trademark Office*